(12) United States Patent
Uehara et al.

(10) Patent No.: US 11,394,881 B2
(45) Date of Patent: Jul. 19, 2022

(54) IMAGE PROCESSING APPARATUS, IMAGE PROCESSING METHOD, STORAGE MEDIUM, SYSTEM, AND ELECTRONIC APPARATUS

(71) Applicant: RICOH COMPANY, LTD., Tokyo (JP)

(72) Inventors: Hiroyasu Uehara, Tokyo (JP); Masakazu Terauchi, Tokyo (JP); Masashi Miyata, Tokyo (JP); Hiroshi Kano, Tokyo (JP); Akira Nakano, Kanagawa (JP); Takeyoshi Nishimura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/939,654

(22) Filed: Jul. 27, 2020

(65) Prior Publication Data

US 2020/0358952 A1 Nov. 12, 2020

Related U.S. Application Data

(63) Continuation of application No. 16/217,536, filed on Dec. 12, 2018, now Pat. No. 10,764,495.

(30) Foreign Application Priority Data

Dec. 14, 2017 (JP) ................................. 2017-239525
Dec. 10, 2018 (JP) ................................. 2018-230626

(51) Int. Cl.
*H04N 5/232* (2006.01)
*H04N 5/262* (2006.01)
*H04N 5/347* (2011.01)
*H04N 5/349* (2011.01)

(52) U.S. Cl.
CPC ..... *H04N 5/23238* (2013.01); *H04N 5/23245* (2013.01); *H04N 5/23287* (2013.01); *H04N 5/2621* (2013.01); *H04N 5/347* (2013.01); *H04N 5/349* (2013.01)

(58) Field of Classification Search
None
See application file for complete search history.

(56) References Cited

U.S. PATENT DOCUMENTS

| 2011/0279712 | A1* | 11/2011 | Hayashi | H04N 9/04515 348/239 |
| 2015/0116538 | A1 | 4/2015 | Terauchi et al. | |
| 2016/0026068 | A1* | 1/2016 | Yamamoto | H04N 5/23245 348/342 |
| 2016/0191820 | A1* | 6/2016 | Iwasaki | H04N 5/35536 348/169 |
| 2016/0344945 | A1 | 11/2016 | Kano | |

(Continued)

FOREIGN PATENT DOCUMENTS

JP 2016-219974 12/2016

*Primary Examiner* — Eileen M Adams
(74) *Attorney, Agent, or Firm* — Xsensus LLP

(57) ABSTRACT

An image processing apparatus includes processing circuitry. The processing circuitry is configured to detect a positional shift amount of each of a plurality of images; select a composite target image from the plurality of images based on the detected positional shift amount; and obtain a composite image based on the positional shift amount and the selected composite target image.

16 Claims, 18 Drawing Sheets

(56) References Cited

U.S. PATENT DOCUMENTS

| | | |
|---|---|---|
| 2016/0366335 A1 | 12/2016 | Miyata et al. |
| 2016/0366340 A1 | 12/2016 | Okamoto et al. |
| 2017/0019599 A1 | 1/2017 | Muramatsu et al. |
| 2017/0076438 A1 | 3/2017 | Kottenstette |
| 2018/0241926 A1 | 8/2018 | Nishimura et al. |

* cited by examiner

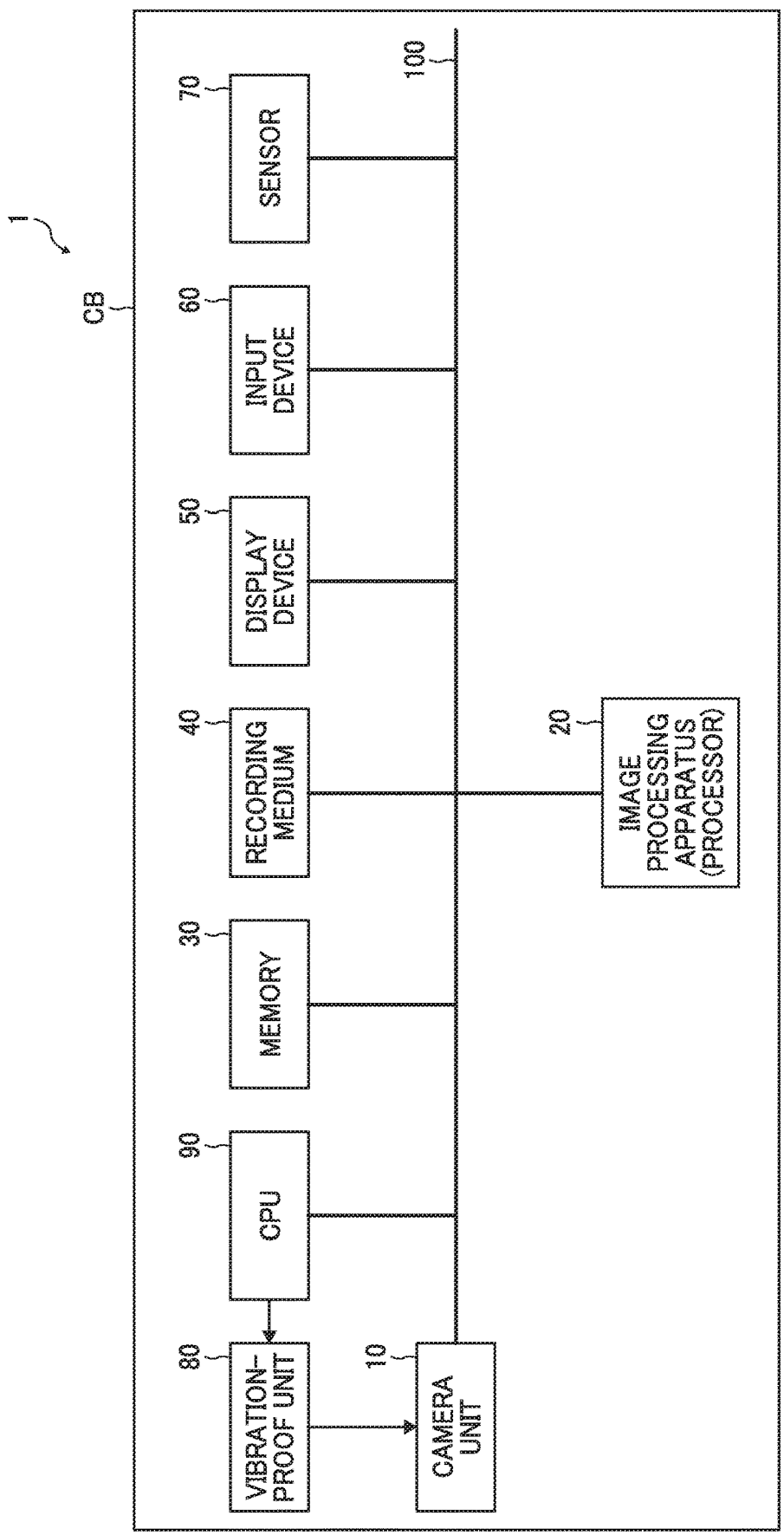

FIRST IMAGE

| 1-1 | 1-2 | ... | ... |
|---|---|---|---|
| ... | ... | ... | ... |
| ... | ... | ... | ... |
| ... | ... | ... | 1-N |

FIG. 10B

SECOND IMAGE

| 2-1 | 2-2 | ... | ... |
|---|---|---|---|
| ... | ... | ... | ... |
| ... | ... | ... | ... |
| ... | ... | ... | 2-N |

FIG. 10C

THIRD IMAGE

| 3-1 | 3-2 | ... | ... |
|---|---|---|---|
| ... | ... | ... | ... |
| ... | ... | ... | ... |
| ... | ... | ... | 3-N |

FIG. 10D

FOURTH IMAGE

| 4-1 | 4-2 | ... | ... |
|---|---|---|---|
| ... | ... | ... | ... |
| ... | ... | ... | ... |
| ... | ... | ... | 4-N |

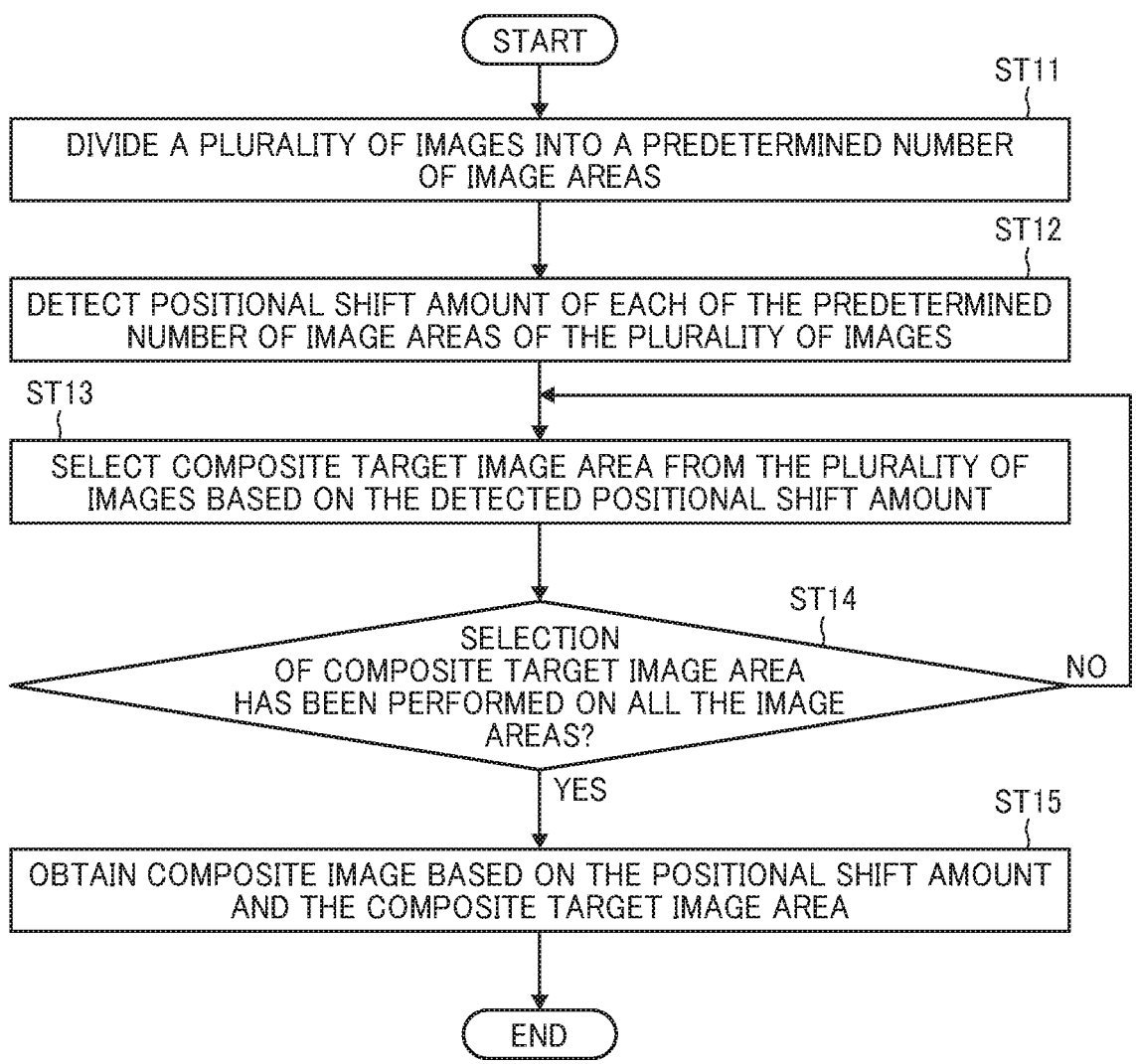

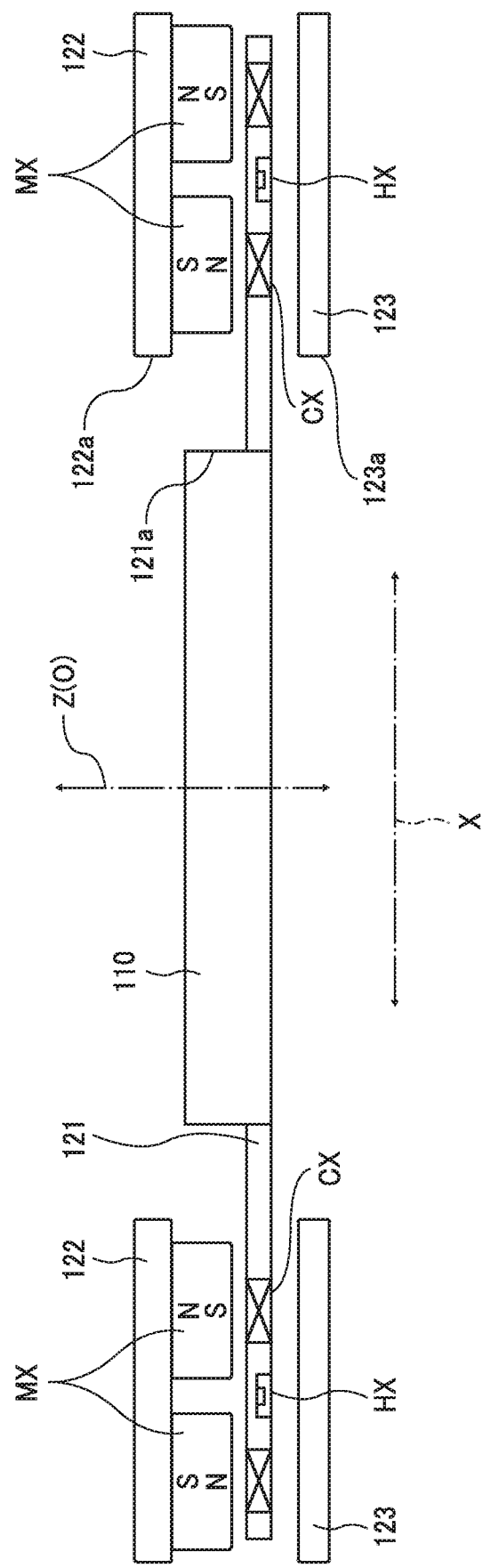

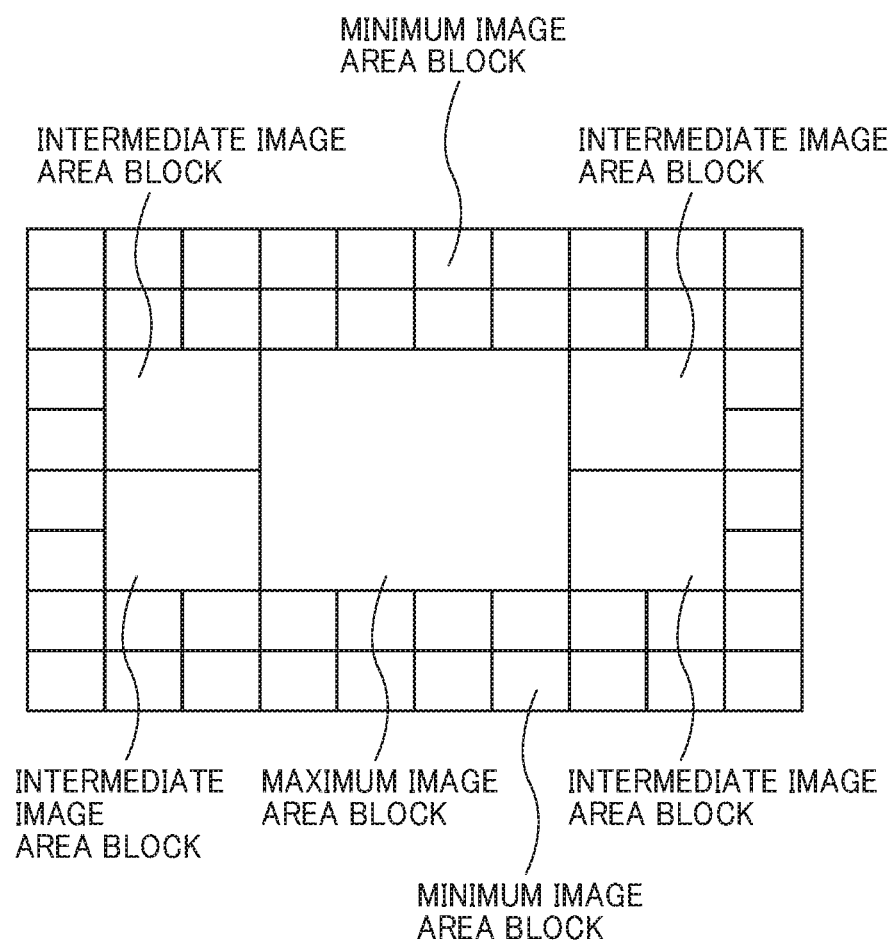

IMAGE PROCESSING APPARATUS, IMAGE PROCESSING METHOD, STORAGE MEDIUM, SYSTEM, AND ELECTRONIC APPARATUS

CROSS-REFERENCE TO RELATED APPLICATIONS

This application is a continuation Application of U.S. application Ser. No. 16/217,536, filed Dec. 12, 2018, which is based on and claims priority pursuant to 35 U.S.C. § 119(a) to Japanese Patent Application No. 2017-239525, filed on Dec. 14, 2017 and Japanese Patent Application No. 2018-230626, filed on Dec. 10, 2018, in the Japan Patent Office, the entire disclosures of which are hereby incorporated by reference herein.

BACKGROUND

Technical Field

Embodiments of the present disclosure relate to an image processing apparatus, an image processing method, an electronic apparatus, and a non-transitory recording medium storing program code for causing the image processing apparatus to perform a method for processing an image.

Background Art

An image-capturing technique called multi-shot compositing is known that obtains a composite image by compositing a plurality of images captured while moving (minutely vibrating) the image sensor on a pixel-by-pixel basis. With such a multi-shot compositing, higher-definition images (higher image quality, higher accuracy) than typical one-shot images can be obtained.

SUMMARY

In one aspect of this disclosure, there is provided an improved image processing apparatus including processing circuitry. The processing circuitry is configured to detect a positional shift amount of each of a plurality of images, select a composite target image from the plurality of images based on the detected positional shift amount, and obtain a composite image based on the positional shift amount and the selected composite target image.

In another aspect of this disclosure, there is provided an improved method of processing an image. The method includes detecting a positional shift amount of each of a plurality of images; selecting a composite target image from the plurality of images based on the detected positional shift amount; and obtaining a composite image based on the positional shift amount and the selected composite target image.

In still another aspect of this disclosure, there is provided an improved non-transitory recording medium storing a program for causing a computer to execute the above-described method.

In yet another aspect of this disclosure, there is provided an improved system including processing circuitry. The processing circuitry is configured to detect a positional shift amount of each of a plurality of images, select a composite target image from the plurality of images based on the detected positional shift amount, and obtain a composite image based on the positional shift amount and the selected composite target image.

In further another aspect of this disclosure, there is provided an improved electronic apparatus including the above-described image processing apparatus and an image-capturing device configured to capture the plurality of images.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 1 is a block diagram of a schematic configuration of an electronic apparatus equipped with a camera unit according to a first embodiment of the present disclosure;

FIGS. 2A, 2B, 2C, and 2D are illustrations for explaining examples of a multi-shot composite mode;

FIGS. 10A, 10B, 10C, and 10D are illustrations of an example in which a plurality of images is divided into a predetermined number of image areas;

FIG. 11 is a flowchart of an example of an image-capturing processing according to the second embodiment of the present disclosure;

FIGS. 12A and 12B are a rear view and a cross-sectional view, respectively, of an example configuration of a vibration-proof unit;

FIG. 17 is an illustration of an example in which a plurality of images is divided in to image areas having different sizes.

Figure 3:
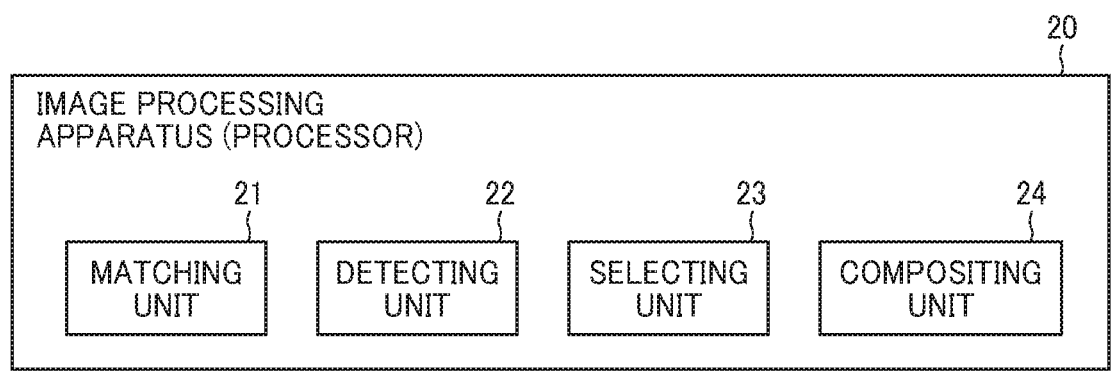
FIG. 3 is a functional block diagram of the image processing apparatus (processor) according to a first embodiment of the present disclosure.
Figure 4A:
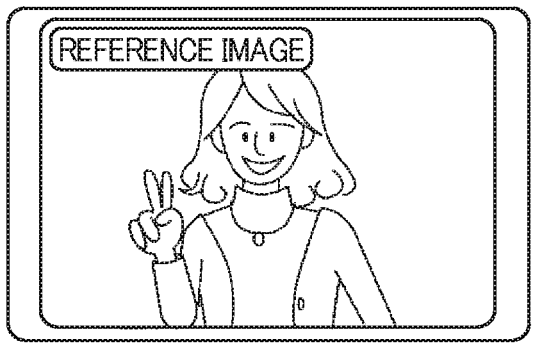
FIG. 4A is an illustration of an example reference image that is one of four images continuously captured.
Figure 4B:
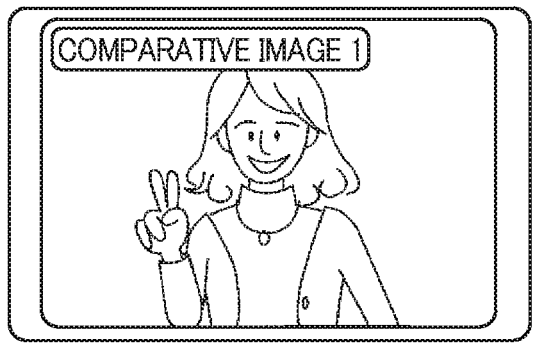
FIGS. 4B, 4C, and 4D are illustrations of remaining three images of the four images set as comparative images.
Figure 4C:
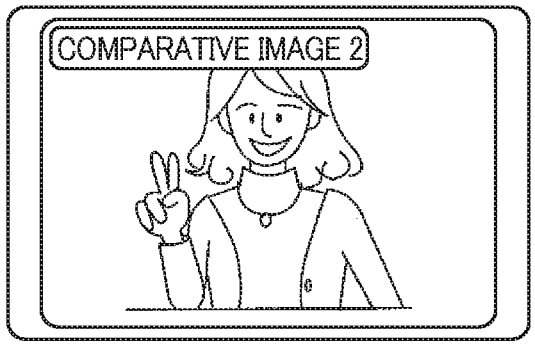
Figure 4D:
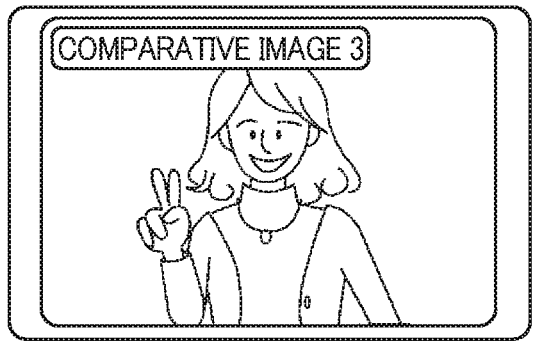

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results. As used herein, the singular forms "a", "an", and "the" are intended to include the plural forms as well, unless the context clearly indicates otherwise.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

First Embodiment

FIG. 1 is a block diagram of a hardware configuration of an electronic apparatus 1 equipped with a camera unit. The electronic apparatus 1 includes an image processing apparatus according to a first embodiment of the present disclosure, and is capable of performing an image processing method according to program code stored in a non-transitory recording medium.

Examples of the electronic apparatus 1 include various kinds of apparatuses equipped with an image-capturing capability such as a digital camera, a mobile phone, and a game machine. In the embodiments of the present disclosure, examples in which the electronic apparatus 1 is a digital camera are described. Alternatively, the electronic apparatus 1 may be various other apparatuses such as personal computers (PCs) that receive an image and performs image processing on the image, without an image-capturing capability. Further, the electronic apparatus 1 according to the embodiments of the present disclosure is capable of executing multi-shot compositing using camera shake. Accordingly, the electronic apparatus 1 is preferably a portable electronic apparatus that easily causes camera shake, having the image-capturing capability.

The digital camera as the electronic apparatus 1 includes, inside a camera body CB, a camera unit (image-capturing device) 10, an image processing apparatus (processor) 20, a memory (for example, a random access memory (RAM)) 30, a recording medium (for example, USB memory) 40, a display device (display) (for example, a liquid crystal display (LCD)) 50, an input device (switch) 60, a sensor 70, a vibration-proof unit (camera shake correction device) 80, and a central processing unit (CPU) 90, which are directly or indirectly connected to each other via a bus 100. Note that the image processing apparatus (processor) 20 and the CPU 90 may be configured by the same hardware device or may be configured as separate hardware device.

Figures 2A, 2B, 2C, 2D:
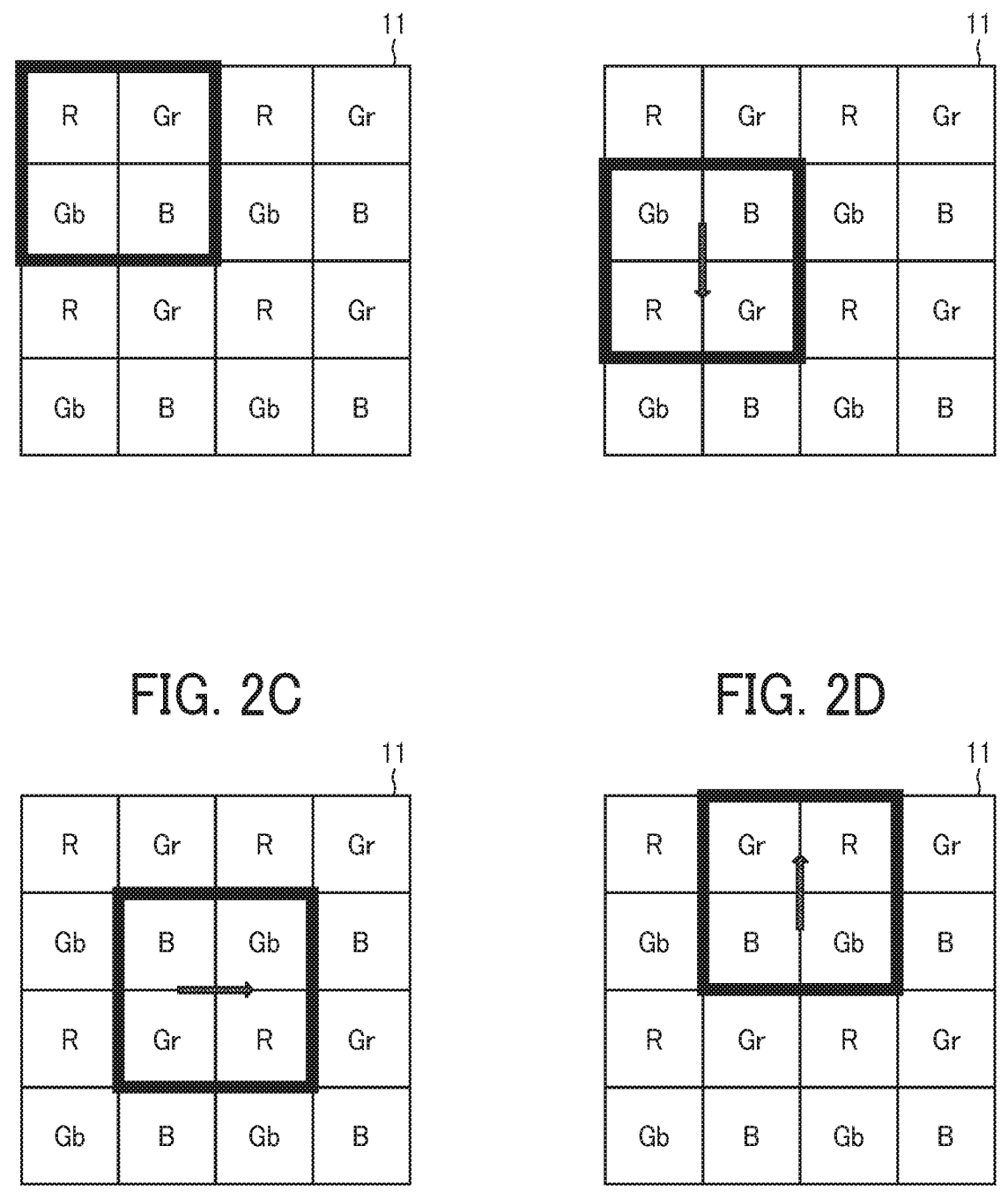

The camera unit 10 has an imaging optical system and an image sensor 11 (FIG. 2). The imaging optical system forms an image of an object (object image) on the light-receiving surface of the image sensor 11, and the image sensor 11 converts the formed image into electrical signals using a plurality of pixels having different detection colors arranged in a matrix. The electrical signals are then transmitted to the image processing apparatus 20 as an image. The image processing apparatus 20 performs predetermined image processing on the image captured by the camera unit 10. The image processed by the image processing apparatus 20 is temporarily recorded in the memory 30. The image recorded in the memory 30 is stored in the recording medium 40 in accordance with the selection and determination by the user and displayed on the display device 50.

The input device 60 includes, for example, a power switch, a release switch, a dial for selecting and setting various functions, a four-way switch, and a touch panel. The sensor 70 includes, for example, an acceleration sensor, an angular velocity sensor, and an angular acceleration sensor for detecting the acceleration, the angular velocity, and the angular acceleration of the body of the digital camera (the electronic apparatus 1), respectively. The output of the sensor 70 is transmitted to the CPU 90 as a shake detection signal indicating shaking of the body of the digital camera.

The vibration-proof unit 80 moves at least one of the imaging optical system and the image sensor 11 of the camera unit 10, as a moving member (drive member), in a direction different from the direction of the optical axis of the imaging optical system (for example, within a plane orthogonal to the optical axis of the imaging optical system). The CPU 90 controls driving of the vibration-proof unit 80. The CPU 90 receives a shake detection signal indicating shaking of the body of the digital camera from the sensor 70 and causes the vibration-proof unit 80 to move the moving member in a direction different from the direction of the optical axis of the imaging optical system. With such a configuration, the image-forming position of the object image is shifted on the image sensor 11 so that the image blurring due to camera shake can be corrected. The configuration of the vibration-proof unit 80 will be described later in detail.

The digital camera (the electronic apparatus 1) operates in a shooting mode (multi-shot composite mode) in which an image capturing operation is performed a plurality of times in chronological order while minutely moving the image sensor 11 of the camera unit 10 in a direction different from the direction of the optical axis of the imaging optical system (for example, within a plane orthogonal to the optical axis of the imaging optical system) using the vibration-proof unit 80. In the shooting mode (image-capturing mode, multi-shot composite mode), the digital camera further composites these images to obtain one composite image (which is obtained not by simply adding the images but by processing image data using special calculations), thus generating a super high-definition (high-quality) image. Unlike the typical composite technology that obtains one-color information for each pixel, in the multi-shot composite mode according to the embodiments of the present disclosure, color information regarding red, green, and blue (RGB) for each pixel is obtained to draw a high-definition image with more detail and better color reproduction. Further, in the multi-shot composite mode according to the embodiments of the present disclosure, higher-sensitivity noise can be reduced without generating moire and false color.

FIGS. 2A, 2B, 2C, and 2D are illustrations for explaining an example of a multi-shot composite mode. In FIGS. 2A to 2D, the image sensor 11 includes a large number of pixels arranged at a predetermined pixel in matrix on a light-receiving surface. One of the Bayer-array color filters R, G (Gr and Gb), and B is disposed on the front surface of each pixel. Each pixel detects the color of an object light beam that has passed through the color filter R, G (Gr, Gb), or B on the front surface and hit the same pixel. That is, each pixel photoelectrically converts light of a color component (color band) into an electrical signal and accumulates electrical charge according to the intensity (luminance) of the light. More specifically, one image is captured at the reference position of FIG. 2A, and another image is captured at a position to which the light flux region surrounded by the thick frame has been moved downward by one pixel relative to the image sensor 11 as illustrated in FIG. 2B. Further, still another image is captured at a position (FIG. 2C) to which the light flux region surrounded by the thick frame has been further moved by one pixel from the position of FIG. 2B to the right relative to the image sensor 11. Then, yet another image is captured at a position (FIG. 2D) to which the light flux region surrounded by the thick frame has been further moved upward from the position of FIG. 2C by one pixel, relative to the image sensor 11. Finally, the light flux region returns to the reference position in FIG. 2A. In such a manner, four images are captured in chronological order while moving (driving) the light flux region surrounded by the thick frame one pixel at a time relative to the image sensor 11 to draw a square within the plane orthogonal to the optical axis. Then, the captured four images are transmitted as raw image data to the image processing apparatus 20. The image processing apparatus 20 composites the four images captured in chronological order by the image sensor 11 to obtain a composite image.

In the multi-shot compositing using the vibration-proof unit 80, the body of the digital camera is attached to, for example, a tripod, so as to reliably move the light flux region on a pixel-by-pixel basis on the image sensor 11. In the electronic apparatus 1 according to the embodiments of the present disclosure, the multi-shot compositing is executable without using the vibration-proof unit 80 (without camera shake correction) and also executable with the body of the digital camera (the electronic apparatus 1) held by the user (photographer). In other words, the electronic apparatus 1 according to the embodiments of the present disclosure obtains a composite image by the multi-shot compositing based on an image misalignment (shift) for each shot due to camera shake (fluctuation) of the photographer, instead of actively moving the image sensor 11. Hereinafter, this shooting (capturing) mode is sometimes called "camera shake multi-shot composite mode".

By operating the input device (switch) 60 of the digital camera, the shooting mode is switched between the camera shake multi-shot composite mode (a given shooting mode) and another shooting mode (for example, the multi-shot composite mode using the vibration-proof unit 80). Further, the display device (display) 50 of the digital camera is capable of displaying the setting status indicating that the camera shake multi-shot composite mode (given shooting mode) is set. In addition to the camera shake multi-shot composite mode, the given shooting mode (particular image processing mode) according to the embodiments of the present disclosure includes a shooting mode (an image processing mode) in which a plurality of images with similar composition, angle, photographing time, and image quality are selected/extracted from a plurality of images continuously shot without camera shake, or from a designated folder and cloud storage in which a set of recorded images such as moving images are stored. The input device (switch) 60 and the display device (display) 50 of the digital camera enable the given shooting mode (particular image processing mode) to be set and displayed.

FIG. 3 is a block diagram of a functional configuration of the image processing apparatus (processor) 20 including a matching unit 21, a detecting unit 22, a selecting unit 23, and a compositing unit 24. These functional units are implemented by the CPU 90 according to an image processing program.

The matching unit 21 determines whether a plurality of images captured by the camera unit 10 are suitable for multi-shot compositing using, for example, a method of evaluating the degree of match between images (for example, pattern matching) or based on the output of the sensor 70. There are degrees of freedom for the number of images, and no specific number is set. For example, the matching unit 21 is capable of executing a matching process when a predetermined number of images (for example, four images) are received by the matching unit 21. For example, when the plurality of images is continuously captured with the same composition and the same angle using the continuous shooting mode (for example, the objects of these images are the same and correlate), the matching unit 21 is more likely to determine that this particular plurality of images is suitable for the multi-shot compositing. However, when a plurality of images is captured with different composition and angles in a staggered manner (for example, the objects of the images are different from each other and are not correlated), the matching unit 21 is more likely to determine that this particular plurality of images is not suitable for the multi-shot compositing. When the matching unit 21 determines that the plurality of images is suitable for the multi-shot compositing, the image processing apparatus 20 continues executing the multi-shot compositing. When the matching unit 21 determines that the plurality of images is not suitable for the multi-shot compositing, the image processing apparatus 20 ends the multi-shot compositing process.

Preferably, the plurality of images, which may include a reference image, comparative images, and a composite target image to be described later, exhibits mutual correlation between pixels. For example, the plurality of images is a moving image or continuously shot images in which there is no significant change in an object to be captured and the degree of exposure. When the object is a still object such as a landscape or a photograph, the plurality of images is not limited to a moving image captured at one time or continuously shot images, and may be captured in a staggered manner. Even when the object to be captured is the same for the plurality of images, the degree of exposure differs depending on the shooting moment such as day and night. In such a case, compositing images might result in failure, described later. To avoid such a situation, the plurality of images is preferably captured at substantially the same degree of exposure. When the plurality of images captured at different degrees of exposure is used for the image compositing, the degrees of exposure of the images are normalized to conform to some one of the degrees of exposure of the images. Thus, the accuracy of pattern matching increases.

When the matching unit 21 determines that the plurality of images is not suitable for the multi-shot compositing, the camera unit 10 continues capturing images while discarding unwanted frames until a plurality of images suitable for multi-shot compositing are obtained. In this case, the shooting conditions may be set (restricted) so as to make it easier to obtain such a plurality of images suitable for the multi-shot compositing. Examples of the shooting conditions include International Organization for Standardization (ISO) sensitivity, shutter speed, aperture opening degree, focal length, shooting distance, and environmental brightness. Such shooting conditions may be set (restricted). Further, when the signal-to-noise ratio (S/N ratio) is poor, the number of images shot by the camera unit 10 can be increased.

The plurality of images to be transmitted to the matching unit 21 is not limited to images immediately after the camera unit 10 shoots. For example, a plurality of images with similar composition, angle, shooting time, and image quality are selected/extracted from a designated folder or cloud storage in which a set of recorded images such as moving images are stored. When such a selection/extraction process is repeated continuously, a plurality of images may be an independent set of N images or may be a set of (N-1) images including identical images.

The detecting unit 22 detects the pixel shift amount (positional shift amount) of each of the plurality of images determined to be suitable for multi-shot compositing by the matching unit 21. The detecting unit 22 may reliably and precisely detect the pixel shift amount of each of the plurality of images using the typical technique such as block matching. In addition, the detecting unit 22 is also capable of reliably and precisely detecting the pixel shift amount of each of the plurality of images using various methods described below.

For example, the detecting unit 22 detects the pixel shift amount of each of the plurality of images based on the output of at least one of the acceleration detector, the angular velocity detector, and the angular acceleration detector, which constitute the sensor 70.

The detecting unit 22 detects the pixel shift amount of each of the plurality of images on a pixel to pixel basis or a sub-pixel to sub-pixel basis, based on the pixel output of the image sensor 11. Further, the detecting unit 22 detects the pixel shift amount of the plurality of images for each RGB plane based on the pixel output of the image sensor 11. In this case, the detecting unit 22 may use only a specific RGB plane out of the plurality of RGB planes, or may change the RGB plane to be used. For example, the detecting unit 22 uses a G (green) plane to detect the pixel shift amount between a first image and a second image, and uses a R (red) plane to detect the pixel shift amount between a third image and a fourth image.

In some embodiments, the detecting unit 22 performs a detection process according to the configuration in which the detection mode using the output of the sensor 70 is combined with the detection mode using the pixel output of the image sensor 11 described above. In such a case, the detecting unit 22 roughly estimates a direction in which pixels are misaligned (shifted) using the output of the sensor 70 before accurately detecting the pixel shift amount using the pixel output of the image sensor 11.

When the pixel output of the image sensor 11 includes a pixel output for a given use, the detecting unit 22 excludes the pixel output for the given use or assigns a low weight to the pixel output for the given use before detecting the pixel shift amount. The pixel output for the given use includes, for example, a phase difference detection pixel to be used in operations other than the shooting operation.

The selecting unit 23 selects a composite target image from the plurality of images according to the pixel shift amount of each of the plurality of images detected by the detecting unit 22. More specifically, the selecting unit 23 sets any one of the plurality of images as a reference image and sets the remaining images as comparative images, and compares the reference image and each of the comparative images to obtain the pixel shift amount between the reference image and each of the comparative images. Then, based on the obtained pixel shift amounts, the selecting unit 23 selects a composite target image from the comparative images.

FIGS. 4A, 4B, 4C, and 4D are illustrations of a reference image and three comparative images 1 to 3 of four continuously shot images, respectively. There is a minute pixel shift (misalignment) on the order of, for example several pixels between the reference image and each of the comparative images 1 to 3, which is difficult to recognize visually. This pixel shift (misalignment) is caused by, for example, camera shake (fluctuation) of the photographer holding the body of the digital camera. In the embodiments of the present disclosure, the pixel shift between the reference image and each of the comparative images 1 to 3 is regarded as the amount of drive of the image sensor 11 (see FIGS. 2A to 2D) in the multi-shot compositing using the vibration-proof unit 80. Accordingly, the multi-shot compositing can be achieved without using the vibration-proof unit 80.

When the pixel coordinates (dx, dy) of the reference image (A) is defined as (0, 0), the selecting unit 23 searches for a combination of the comparative images (B, C, and D) of the pixel coordinates (dx, dy) as described below. In this case, each pixel coordinate represents the pixel shift amount of each comparative image.

(A) reference image: (dx, dy)=(0, 0)

(B) Comparative image: (dx, dy)=(even number, odd number)

(C) Comparative image: (dx, dy)=(odd number, odd number)

(D) Comparative image: (dx, dy)=(odd number, even number)

Ideally, the pixel coordinates (dx, dy) of each comparative image are represented by an integer number of pixels, but in fact, such cases do not exist. It is difficult to select a composite target image that satisfies any of the above-described (A) to (B). In view of such a situation, the selecting unit 23 sets an allowable error "Eallowable" of one pixel or less that satisfies −0.25<Eallowable<0.25, for example, and selects a target composite image. More specifically, the selecting unit 23 replaces (A) to (D) with the following (A') to (D') and selects a target composite image. If the value of Eallowable is 0 in (A') to (D'), the values of (A) to (D) are equal to the values of (A') to (D').

(A') Reference image: (dx, dy)=(0, 0)

(B') Comparative image: (dx, dy)=(even number+Eallowable, odd number+Eallowable)

(C') Comparison image: (dx, dy)=(odd number+Eallowable, odd number+Eallowable)

(D') Comparative image: (dx, dy)=(odd number+Eallowable, even number+Eallowable)

By setting the allowable error Eallowable within the range of −0.25<Eallowable<0.25, only the pixel coordinates in the range close to the integer pixel can be picked up and so a composite target image can be selected with high accuracy and reliability, irrespective of whether the number of shifted pixels is an even number or an odd number. For example, when a certain pixel coordinate is "−2.90" or "3.22", the allowable error Eallowable is applied to the value. Accordingly, the pixel coordinate is determined to be close to "3", and such a pixel coordinate is selected. However, when a certain pixel coordinate is "−2.64" or "3.38", it is determined to be not close to "3" even after applying the allowable error Eallowable to the pixel coordinate, and such a pixel coordinate is not selected. Note that, by setting the allowable error Eallowable within the range of −0.5<Eallowable<0.5, the pixels in the vicinity of the intermediate value between the odd pixel and the even pixel are successfully sorted into the odd pixel or the even pixel. For example, when certain pixel coordinates are "3.48" and "3.53" in the vicinity of an intermediate value between an odd pixel and an even pixel, it is determined that "3.48" is close to "3" and "3.53" is close to "4".

The selecting unit 23 sets the reference image that satisfies the above-described (A') among the plurality of images and also selects the comparative image that satisfies at least one of the above (B') and/or the comparative image that satisfies the above (D') as a composite target image(s). With this configuration, two types of G (Gr, Gb) can be included as the color-information component for each pixel to composite images, which is to be described later.

More preferably, the selecting unit 23 sets the reference image that satisfies the above (A') among the plurality of images, and selects comparative image that satisfies the above (B') and the comparative image that satisfies the above (C'), and the comparative image that satisfies the above (D') as the composite target images (in this case, a plurality of composite target images is selected from the comparative images). This configuration enables the RGB color-information components to be included in each pixel for composite images, which will be described later.

Upon failing to select the composite target image from the comparative images, the selecting unit 23 enlarges (increases) the boundary value (absolute value) of the allowable value Eallowable and retries to select a composite target image. For example, the selecting unit 23 sets the absolute value of the allowable value Eallowable to 0.01 at the first selection of the composite target image, and sets the absolute value of the allowable value Eallowable to 0.05 at the second selection of the composite target image. Further, the selecting unit 23 sets the absolute value of the allowable value Eallowable to 0.10 at the third selection of the composite target image, and sets the absolute value of the allowable value Eallowable to 0.15 at the fourth selection of the composite target image. Still further, the selecting unit 23 sets the absolute value of the allowable value Eallowable to 0.20 at the fifth selection of the composite target image, and sets the absolute value of the allowable value Eallowable to 0.25 at the sixth selection of the composite target image. When still failing to select the composite target image after setting the absolute value of the allowable value Eallowable to 0.25, the selecting unit 23 ends the process of selecting the composite target image. By gradually increasing the boundary value (absolute value) of the allowable value Eallowable, the accuracy of selection of the composite target image is gradually reduced.

Upon failing to select the composite target image from the comparative images, the selecting unit 23 resets the reference image (and the comparative images), and retries to select the composite target image. Since the pixel shift amount is defined by the relation with the reference image, whether the composite target image is successfully selected depends on the reference image set among the plurality of images. For such a reason, the composite target image may be successfully selected by resetting the reference image to select the composite target image again. That is, when a certain image is set as the reference image and selecting the composite target image fails, another image is set as the reference image, which might enable the composite target image to be successfully selected.

When the pixel coordinates (dx, dy) of the comparative image, which is the pixel shift amount, exceed a predetermined error threshold (for example, several tens of pixels), the selecting unit 23 ends the process of selecting the composite target image.

The compositing unit 24 obtains a composite image based on the pixel shift amount detected by the detecting unit 22 and the composite target image (the composite target image selected based on the reference image and the comparative images) selected by the selecting unit 23. The compositing unit 24 performs image calculation on the composite target image (the composite target image selected based on the reference image and the comparative images) selected by the selecting unit 23, according to the pixel shift amount detected by the detecting unit 22, so as to obtain a composite image.

More specifically, the compositing unit 24 moves the composite target image (the composite target image selected based on the reference image and the comparative images) selected by the selecting unit 23 according to the pixel shift amount detected by the detecting unit 22, so as to obtain a composite image. The expression "moves the composite target image" means correcting the data of the reference image such that the composite target image is moved relative to the reference image. In other words, "to move the composite target image" means extracting the image data in which the composite target image has been moved relative to the reference image when compositing the composite target image and the reference image.

The compositing unit 24 moves the composite target image (the composite target image selected based on the reference image and the comparative images) relative to the reference image according to the pixel shift amount detected by the detecting unit 22, such that the composite target image overlays the reference image.

The compositing unit 24 moves the composite target image (the composite target image selected based on the reference image and the comparative images), relative to the reference image in movement unit amounts (accuracy of movement) different from a detection unit amount at which the pixel shift amount is detected by the detecting unit 22. For example, the accuracy of detection of the pixel shift amount performed by the detecting unit 22 is in units of sub-pixels, whereas the accuracy of movement of the composite target image is in units of pixels. As described above, the compositing unit 24 may move the composite target image (the composite target image selected based on the reference image and the comparative images) relative to the reference image at a movement pixel level (a pixel resolution for each movement, a pixel interval for each movement, and a pixel basis for each movement) different from a detection pixel level (pixel resolution for each detection, a pixel interval for each detection, and a pixel basis for each detection) at which the pixel shift amount is detected by detecting unit 22.

In accordance with the examples of (A) to (D) and (A') to (D') above, the pixel coordinates of the reference image and the comparative images (composite target image) after the relative movement by the compositing unit 24 are represented by the following (A") to (D"). If the allowable error Eallowable is ignored, the four images represented by (A") to (D") are equivalent to the four images (FIGS. 2A to 2C) used in the multi-shot compositing using the vibration-proof unit 80. Of course, even if the allowable error Eallowable remains, the four images equivalent to the images in the multi-shot compositing using the vibration-proof unit 80 are obtained.

(A") Reference image: (dx, dy)=(0, 0)

(B") Comparative image: (dx, dy)=(0+Eallowable, 1+Eallowable)

(C") Comparative image: (dx, dy)=(1+Eallowable, 1+Eallowable)

(D") Comparative image: (dx, dy)=(1+Eallowable, 0−Eallowable)

Figure 5:
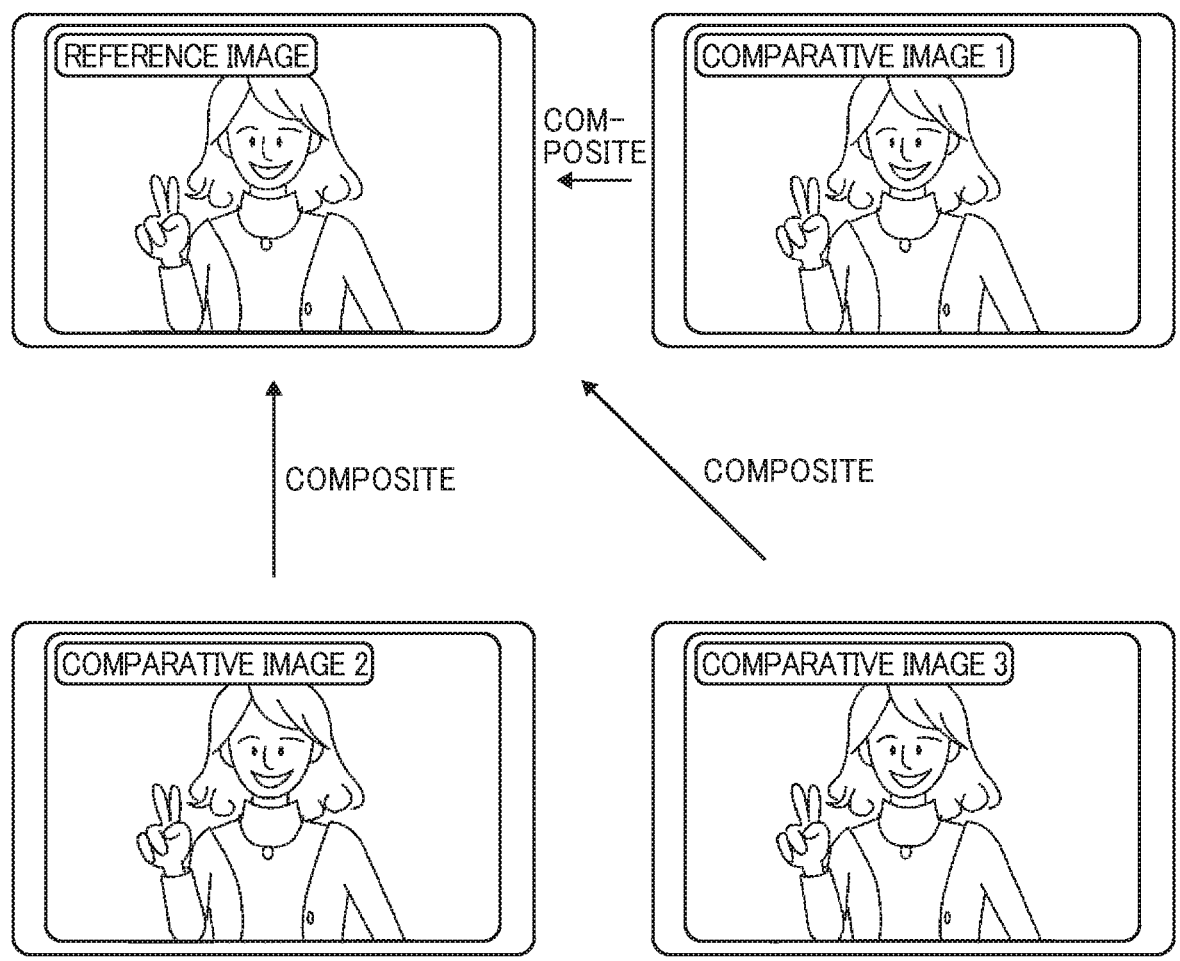
FIG. 5 is a conceptual diagram for explaining a composite image obtained by compositing a reference image and comparative images.

FIG. 5 is a conceptual diagram of a case in which a composite image is obtained by compositing the reference image and the comparative images 1 to 3. Since the composite image obtained by the composite unit 24 includes two color-information components of G (Gr, Gb) or RGB color-information components for each pixel, a high-definition image with fine detail and better color reproduction can be drawn. Further, higher-sensitivity noise can be reduced without generating moire and false color.

Figure 6:
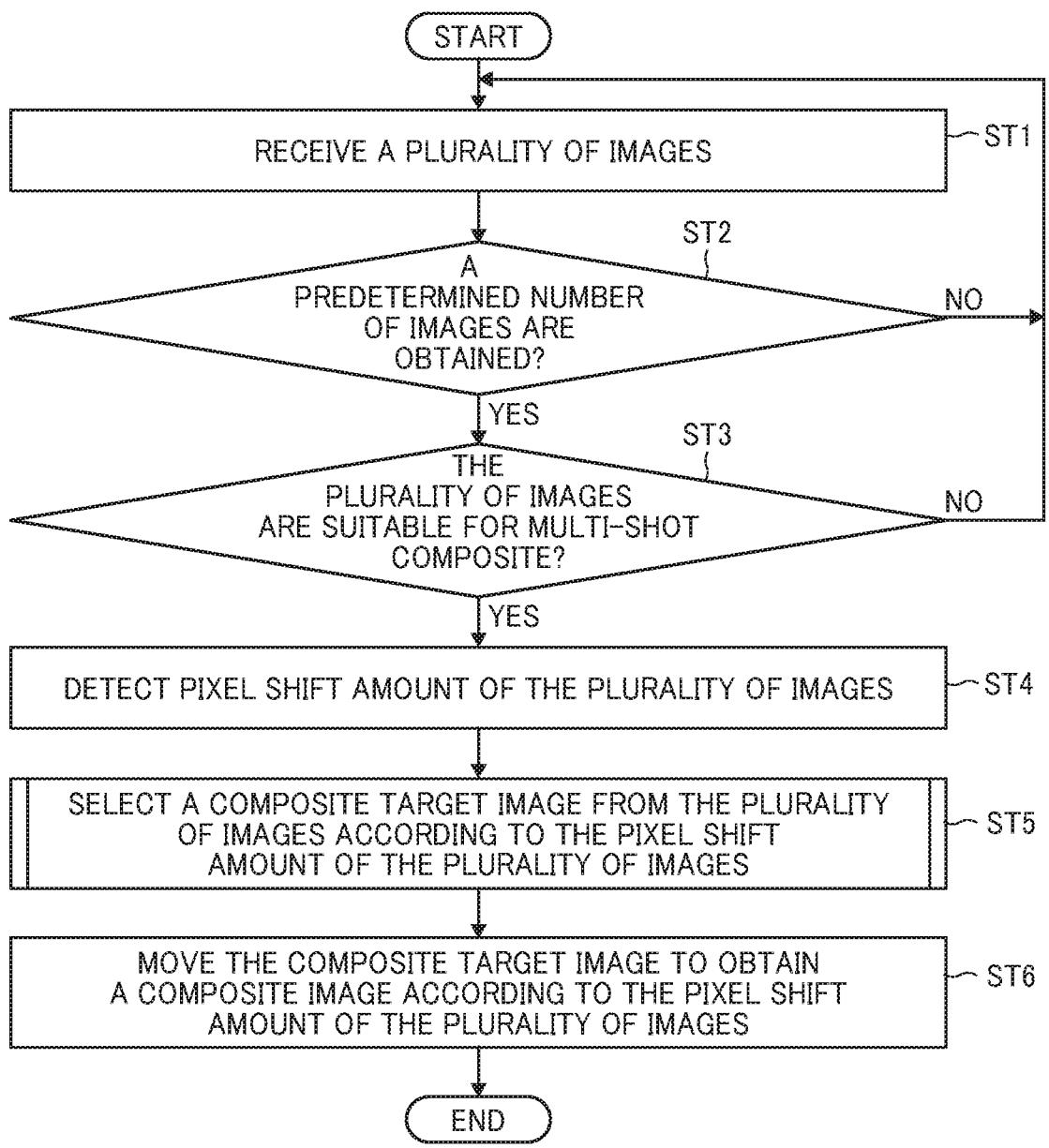
FIG. 6 is a flowchart of image processing performed by the image processing apparatus according to an embodiment of the present disclosure.

FIG. 6 is a flowchart of a process of processing an image performed by the image processing apparatus 20. Referring to FIG. 6. the process of processing an image performed by the image processing apparatus 20 is described below in detail. This process of processing an image is implemented by causing a computer, which is a component of the image processing apparatus 20, to execute a predetermined program.

In step ST1, the image processing apparatus 20 receives a plurality of images. The plurality of images may be, for example, a plurality of images continuously shot by the camera unit 10, or selected and extracted from among a designated folder or cloud storage in which a set of recorded images such as moving images is stored.

In step ST2, the matching unit 21 determines whether the number of the plurality of images received by the image processing apparatus 20 has reached a predetermined number (for example, four). When the number of the plurality of images has not reached the predetermined number (NO in step ST2), the process returns to step ST1 and waits until the number of the plurality of images received reaches the predetermined number. When the number of the plurality of images has reached the predetermined number (YES in step ST2), the process proceeds to step ST3.

In step ST3, the matching unit 21 determines whether the plurality of images (the predetermined number of images) received by the image processing apparatus 20 is suitable for the multi-shot compositing (for example, the multi-shot composite mode using the camera shake). When the matching unit 21 determines that the plurality of images received by the image processing apparatus 20 is suitable for the multi-shot compositing (YES in step ST3), the process proceeds to step ST4. When the matching unit 21 determines that the plurality of images received by the image processing apparatus 20 is not suitable for the multi-shot compositing (NO in step ST3), the process returns to step ST1 and waits for a plurality of images (a predetermined number of images) to be received by the image processing apparatus 20 again.

In step ST4, the detecting unit 22 detects the pixel shift amount (positional shift amount) of each of the plurality of images. The detecting unit 22 detects the pixel shift amount, for example, using at least one of the output of the sensor 70 and the pixel output of the image sensor 11.

In step ST5, the selecting unit 23 selects a composite target image (a composite target image selected using the reference image and the comparative images) from the plurality of images according to the pixel shift amount of each of the plurality of images detected by the detecting unit 22. The process of selecting the composite target image performed by the selecting unit 23 (in ST5) is further described as a sub-routine in the flowcharts of FIGS. 7 and 8.

In step ST6, the compositing unit 24 obtains a composite image by moving the composite target image (the composite target image selected using the reference image and the comparative images) selected by the selecting unit 23, relative to the reference image according to the pixel shift amount detected by the detecting unit 22. As a result, the composite target image (the composite target image selected using the reference image and the comparative images) is caused to overlay the reference image according to the pixel shift amount of each of the plurality of images detected by the detecting unit 22. Further, the pixel shift amount of (each of) the overlaid composite target image(s) is, for example, represented on a pixel-by-pixel basis as indicated by the above (A") to (D"). Since the composite image obtained by the composite unit 24 includes two color-information components of G (Gr, Gb) or RGB color-information components for each pixel, a high-definition image with fine detail and better color reproduction can be drawn. Further, higher-sensitivity noise can be reduced without generating moire and false color.

Note that, when the pixel shift amount of the composite target image is the pixel shift amount on a pixel-by-pixel basis as represented by the above (A") to (D"), each composite target image is preferably shifted by an odd number of pixels in at least one of the horizontal direction and the vertical direction. For example, the pixel shift amount of 5.1 is more preferable than the pixel shift amount of 1.5 because the pixel shift amount of 5.1 is closer to 5 pixels (odd number of pixels) than the pixel shift amount of 1.5. More specifically, the composite target image is preferably shifted by the odd number of pixels in the horizontal direction and by the even number of pixels in the vertical direction relative to the reference image. Alternatively, the composite target image is preferably shifted by the odd number of pixels in the vertical direction and by the even number of pixels in the horizontal direction relative to the reference image. This is because, when the composite target image is shifted by the odd number of pixels or the even number of pixels in both the horizontal and vertical directions, almost the same image is obtained even after the movement of the composite target image relative to the reference image, because the resolutions of the two color-information components of G (Gr, Gb) fail to increase.

Figure 7:
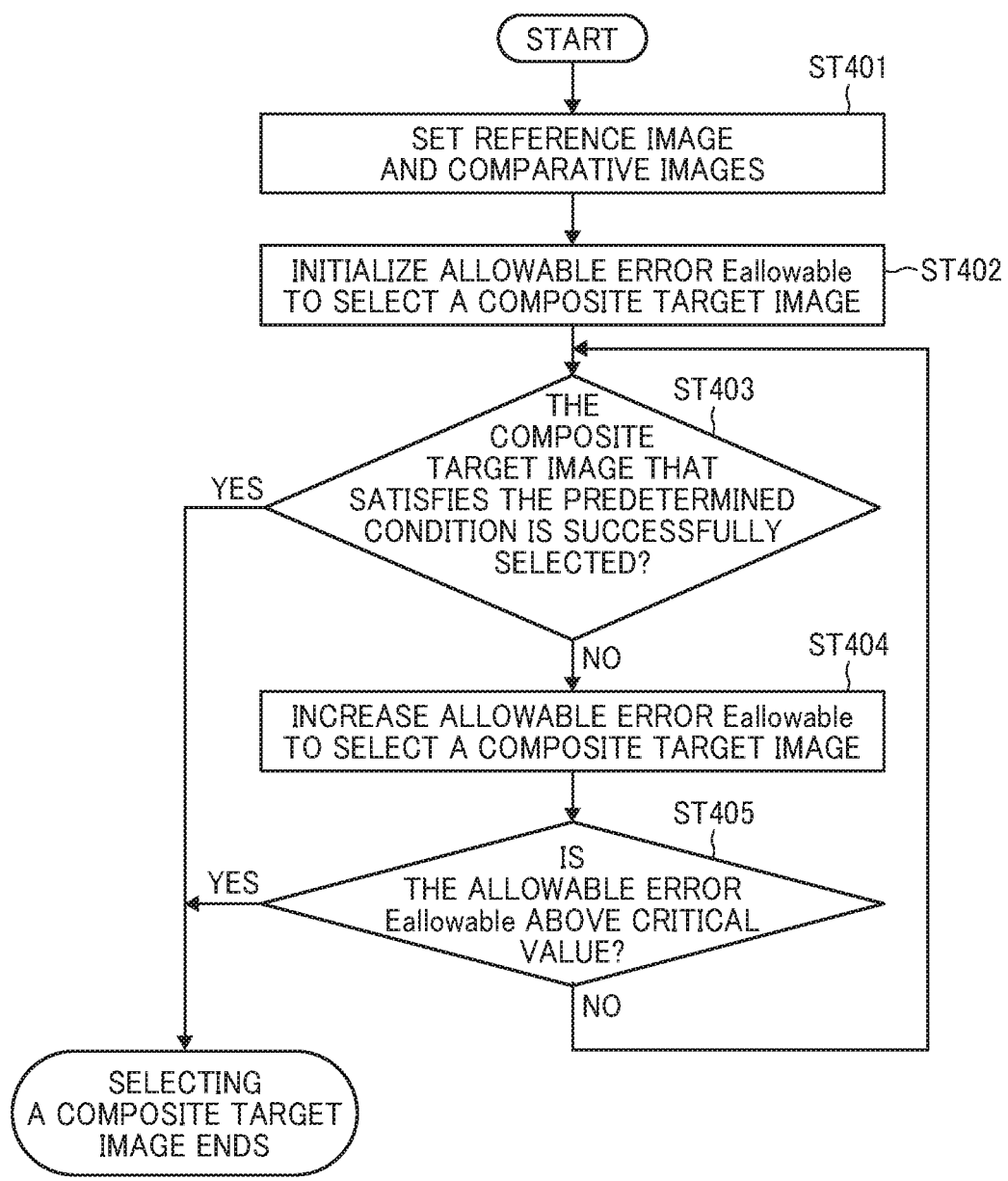
FIG. 7 is a flowchart of a process of selecting a composite target image performed by a selecting unit, according to an embodiment of the present disclosure.

Referring to FIG. 7, a first process of selecting the composite target image performed by the selecting unit 23 will be described in detail.

In step ST401, the selecting unit 23 sets one of the plurality of images as the reference image and sets the remaining images as the comparative images (sets the reference image and the comparative images).

In step ST402, the selecting unit 23 initializes an allowable error Eallowable for selecting a composite target image. For example, the selecting unit 23 initializes the absolute value of Eallowable to 0.01.

In step ST403, the selecting unit 23 tries to select a composite target image that satisfies a predetermined condition. In this case, satisfying the predetermined condition means satisfying the above (A'), (B') and/or (D'), or satisfying the above (A') to (D'). The selecting unit 23 tries to select a composite target image that satisfies the predetermined condition for each combination of the reference image and each comparative image (the plurality of images). The selecting unit 23 tries to select the composition target image that satisfies the predetermined condition for plural times. When the selecting unit 23 has successfully selected the composition target image that satisfies the predetermined condition (YES in step ST403), the process of selecting the composite target image ends. When the selecting unit 23 fails to select the composite target image that satisfies the predetermined condition (NO in step ST403), the process proceeds to step ST404.

In step ST404, the selecting unit 23 increases the allowable error Eallowable for selecting the composite target image. For example, the selecting unit 23 increases the absolute value of Eallowable from 0.01 to 0.05.

In step ST405, the selecting unit 23 determines whether the absolute value of the allowable error Eallowable for selecting the composite target image exceeds a critical value (for example, 0.25). When the absolute value of the allowable error Eallowable for selecting the composite target image exceeds the critical value (YES in step ST405), the process of selecting the composite target image ends. When the absolute value of the allowable error Eallowable for selecting the composite target image falls below the critical value (NO in step ST405), the process returns to step ST403 to try select the composite target image that satisfies the predetermined condition using the increased allowable error Eallowable.

Figure 8:
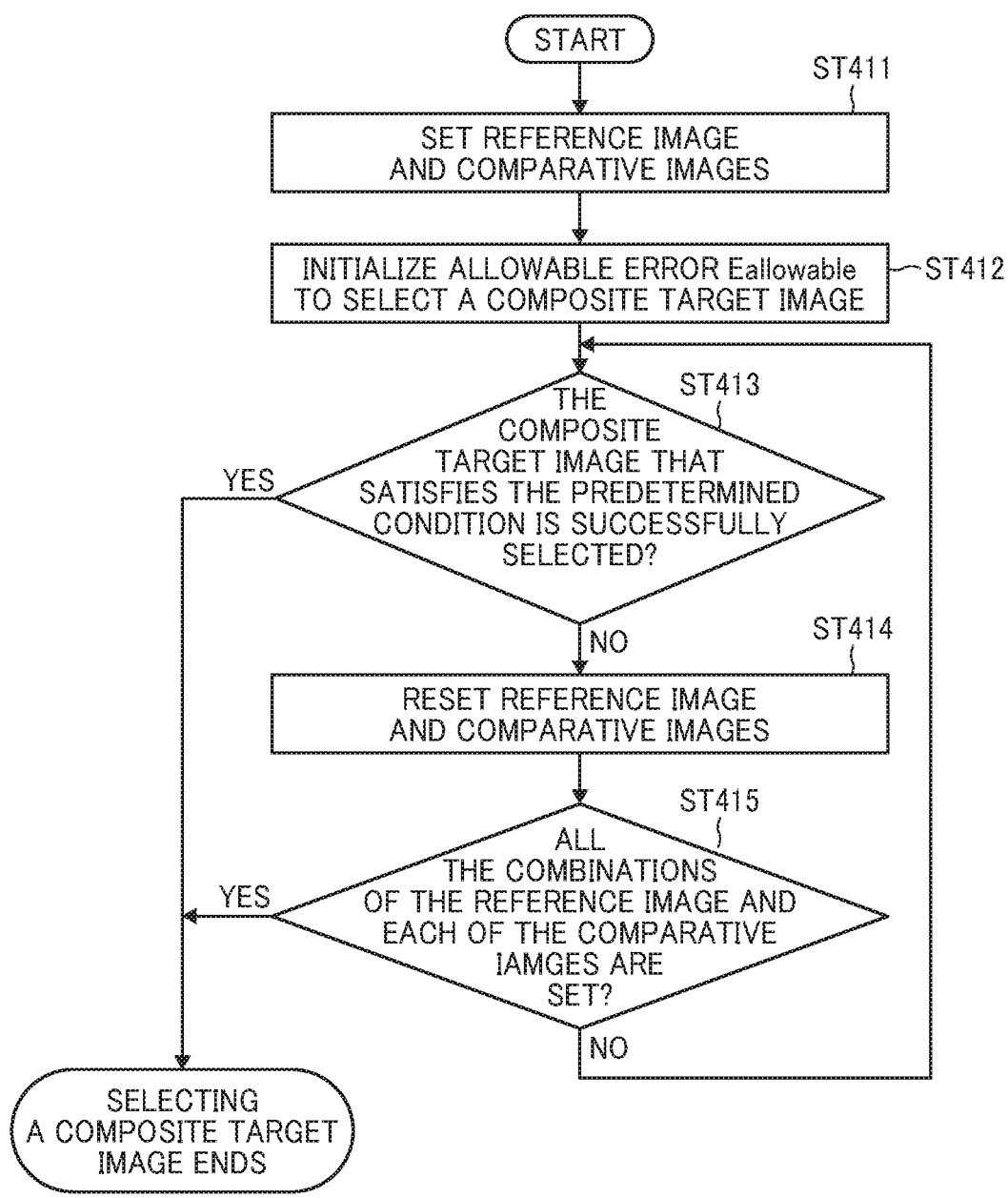
FIG. 8 is a flowchart of a process of selecting a composite target image performed by a selecting unit according to another embodiment of the present disclosure.

Referring to FIG. 8, a second process of selecting the composite target image performed by the selecting unit 23 will be described in detail.

In step ST411, the selecting unit 23 sets one of the plurality of images as the reference image and sets the remaining images as the comparison image (sets the reference image and the comparative images).

In step ST412, the selecting unit 23 sets an allowable error Eallowable for selecting a composite target image.

In step ST413, the selecting unit 23 tries to select a composite target image that satisfies the predetermined condition. In this case, satisfying the predetermined condition means satisfying the above (A'), (B') and/or (D'), or satisfying the above (A') to (D'). When the selecting unit 23 has successfully selected the composition target image that satisfies the predetermined condition (YES in step ST413), the process of selecting the composite target image ends. When the selecting unit 23 fails to select the composite target image that satisfies the predetermined condition (NO in step ST413), the process proceeds to step ST414.

In step ST414, the selecting unit 23 re-sets the reference image and the comparative images.

In step ST415, the selecting unit 23 determines whether all the combinations of the reference image and each of the comparative images have been set. When all the combinations of the reference image and each of the comparative images are set (YES in step ST415), the process of selecting the composite target image ends. When all the combinations of the reference image and each of the comparative images are not set (NO in step ST415), the process returns to step ST413 to retry to select the composite target image that satisfies the predetermined condition using the reset reference image and comparative images.

The first selecting process of FIG. 7 and the second selecting process of FIG. 8 may be combined as appropriate. That is, when failing to select the composite target image that satisfies the predetermined condition, the selecting unit 23 increases (expands) the allowable error Eallowable for selecting the composite target image and resets the reference image and the comparative images.

The digital camera according to the embodiments of the present disclosure has a multi-shot composite mode using the vibration-proof unit 80 (for example, micro vibration for multi-shot compositing) and a multi-shot composite mode (for example, the multi-shot composite mode using camera shake) without using the vibration-proof unit 80. The digital camera includes a setting unit (for example, a setting button and a touch panel) for setting each shooting mode. The digital camera is capable of issuing a warning by voice or on a display when the digital camera fixed to, for example, a tripod is set to the multi-shot composite mode in which the vibration-proof unit 80 is not used, or when the digital camera held by hand is set to the multi-shot composite mode in which the vibration-proof unit 80 is used. Further, the digital camera is capable of detecting whether the digital camera is fixed to a tripod. When it is determined that the digital camera is fixed to the tripod, the digital camera is automatically set to the multi-shot composite mode in which the vibration unit 80 is used. When it is determined that the digital camera is not fixed to the tripod, the digital camera is automatically set to the multi-shot composite mode in which the vibration-proof unit 80 is not used.

Second Embodiment

The second embodiment of the present disclosure is described with reference to FIGS. 9 to 11. Descriptions redundant with the descriptions of the first embodiment are omitted and only the differences are described below.

Figure 9:
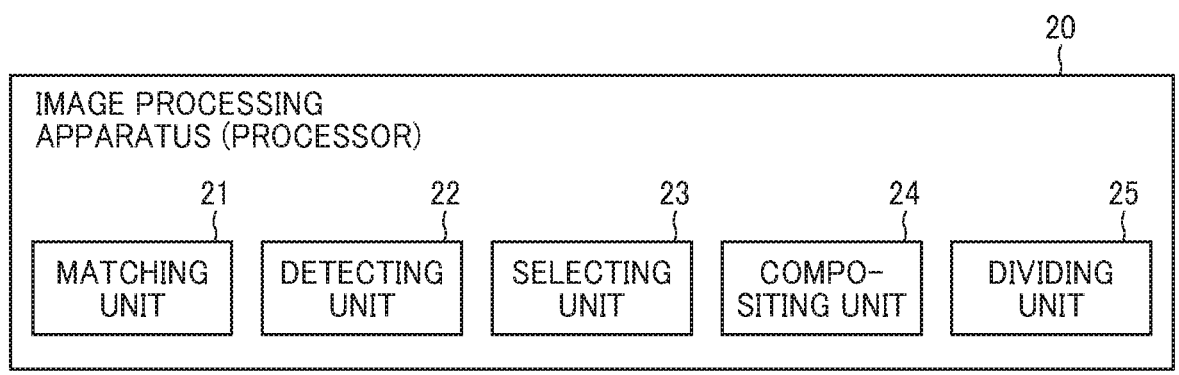
FIG. 9 is a functional block diagram of an image processing apparatus (processor) according to a second embodiment of the present disclosure, illustrating the internal structure of the image processing apparatus.

FIG. 9 is a block diagram of a functional configuration of an image processing apparatus (processor) 20 according to the second embodiment of the present disclosure. As illustrated in FIG. 9, the image processing apparatus (processor) 20 according to the second embodiment further includes a dividing unit 25 in addition to the matching unit 21, the detecting unit 22, the selecting unit 23, and the compositing unit 24.

The dividing unit 25 divides the plurality of images into a predetermined number of image areas (for example, corresponding image areas). FIGS. 10A to 10D are illustrations of an example in which the plurality of images is divided into a predetermined number of image areas. In FIG. 10A, the first image is divided into image areas 1-1, 1-2, . . . 1-N in matrix each having the same size in the horizontal and vertical directions. In FIG. 10B, the second image is divided into image areas 2-1, 2-2, . . . 2-N in matrix each having the same size in the vertical and horizontal directions. In FIG. 10C, the third image is divided into image areas 3-1, 3-2, . . . 3-N in matrix each having the same size in the vertical and horizontal directions. In FIG. 10D, the fourth image is divided into image areas 4-1, 4-2, . . . 4-N in matrix each having the same size in the vertical and horizontal directions. The block size of each image area allows for a certain latitude. For example, the block size of each image area may be set to 128 pixels×128 pixels.

The detecting unit 22 detects a positional shift amount (pixel shift amount) of each of the predetermined number of image areas (for example, each of corresponding image areas) of the plurality of images, the corresponding image areas. Referring to the example of FIGS. 10A to 10D, the detecting unit 22 detects the positional shift amount (pixel shift amount) between the image area 1-1 of the first image, the image area 2-1 of the second image, the image area 3-1 of the third image, and the image area 4-1 of the fourth image. Further, the detecting unit 22 detects the positional shift amount (pixel shift amount) between the image area 1-2 of the first image, the image area 2-2 of the second image, the image area 3-2 of the third image, and the image area 4-2 of the fourth image. Further, the detecting unit 22 detects the positional shift amount (pixel shift amount)

between the image area 1-N of the first image, the image area 2-N of the second image, the image area 3-N of the third image, and the image area of the fourth image 4-N. In this configuration, the detecting unit 22 calculates the correlation between blocks at the same position of each image, for example, by subpixel estimation.

The selecting unit 23 selects a composite target image area from a plurality of images according to the positional shift amount (pixel shift amount), which is the correlation value detected by the detecting unit 22. For example, the selecting unit 23 sets each image area of one of the images as the reference image area and sets the image areas of the other images as the comparative image areas. Then, the selecting unit 23 selects, as a composite target image area, one of the comparative image areas based on the positional shift amount (pixel shift amount) between the reference image area and each of the comparative image areas. Specifically, the selecting unit 23 selects a comparative image area whose positional shift amount (pixel shift amount) is less than or equal to a predetermined threshold, whose positional shift amount is smallest among the positional shift amounts between the reference image area and the comparative image areas, and whose positional shift amount corresponds to odd number of pixels or even number of pixels. For example, when the image areas 1-1 to 1-N of the first image in FIG. 10A are set as the reference image area, the selecting unit 23 selects at least one of the image areas 2-1, 3-1, 4-1 as a composite target image area for the reference image area 1-1. Further, the selecting unit 23 selects at least one of the image areas 2-2, 3-2, 4-2 as a composite target image area for the reference image area 1-2. Still further, the selecting unit 23 selects at least one of the image areas 2-N, 3-N, 4-N as a composite target image area for the reference image area 1-N.

The compositing unit 24 obtains a composite image based on the positional shift amount (pixel shift amount), which is the correlation value detected by the detecting unit 22, and the composite target image area selected by the selecting unit 23. The compositing unit 24 obtains a composite image by performing image calculation on the composite target image area selected by the selecting unit 23, according to the positional shift amount (pixel shift amount) that is the correlation value detected by the detecting unit 22. For example, the compositing unit 24 composites or replaces the reference image area 1-1 in FIG. 10A with the composite target image area selected from the comparative image areas 2-1 to 4-1 in FIGS. 10B to 10D. Further, the compositing unit 24 composites (replaces) the reference image area 1-2 in FIG. 10A with the composite target image area selected from the comparative image areas 2-2 to 4-2 in FIGS. 10B to 10D. Further, the compositing unit 24 composites (replaces) the reference image area 1-N in FIG. 10A with the composite target image area selected from the comparative image areas 2-N to 4-N in FIGS. 10B to 10D.

As a result, the compositing unit 24 performs image calculation (composition or replacement) on the composite target image areas obtained by the detecting unit 22 and the selecting unit 23 in cooperation with each other for each of the plurality of image areas divided by the dividing unit 25.

That is, each reference image area of one reference image is composited or replaced with a composite target image area selected from comparative image areas of the comparative images. For example, the reference image area 1-1 of the first image (the reference image) is composited or replaced with the composite target image area 2-1 of the second image, and the reference image area 1-2 of the first image is composited or replaced with the composite target image area 3-2 of the third image. Further, the reference image area 1-N of the first image is composited or replaced with a composite target image area 4-N of the fourth image.

When the selecting unit 23 fails to select a composite target image area from the comparative image areas of the comparative images for a certain reference image of the reference image, the reference image area as is is used without the composition or replacement of the reference image area.

FIG. 11 is a flowchart of an image-capturing process according to a second embodiment of the present disclosure.

In step ST11, the dividing unit 25 divides a plurality of images into a predetermined number of image areas.

In step ST12, the detecting unit 22 detects the positional shift amount (pixel shift amount) of each of the predetermined number of image areas of the plurality of images.

In step S13, the selecting unit 23 selects a composite target image area from the plurality of images according to the positional shift amount (pixel shift amount) that is the correlation value detected by the detecting unit 22.

In step ST14, it is determined whether a composite target image area has been selected from all sets of image areas. When the composite target image area has not been selected from all sets of image areas (NO in step ST14), the process returns to step ST13 to repeat the loop of step ST13 and step ST14 until the composite target image area is selected for all the image areas. When the combination target image area is selected from each set of the image areas (YES in step ST14), the process proceeds to step ST15.

In step ST15, the compositing unit 24 obtains a composite image based on the positional shift amount (pixel shift amount), which is the correlation value detected by the detecting unit 22, and the composite target image area selected by the selecting unit 23.

In the second embodiment described above, a plurality of images is divided into a predetermined number of image areas, and the positional shift amount of each of the predetermined number of image areas in the plurality of images is detected. Then, a composite target image area is selected from the plurality of images based on the positional shift amount, and a composite image is obtained based on the positional shift amount and the composite target image area With the configuration according to the second embodiment of the present disclosure, higher-quality image with high detail and less moiré, false color, and high sensitivity noise can be provided as compared to the configuration according to the first embodiment in which the positional shift amount is detected on an image-by-image basis and a composite target image is selected to obtain a composite image.

Third Embodiment

The digital camera according to the first and second embodiments does not drive (for example, image blur (vibration) correction drive) a moving member (for example, the image sensor 11) using the vibration-proof unit 80 in the multi shot composite mode. However, when the image blur correction drive is performed crudely while using the vibration-proof unit 80 without perfectly correcting the positional shift of a plurality of images (images are not perfectly aligned at a specific position), the image blur correction drive is executed using the vibration-proof unit 80.

That is, executing the image blur correction drive using vibration-proof unit 80 still fails to completely eliminate image blur (the image is misaligned (shifted) on the order of several microns). Accordingly, in the configuration according to the third embodiment, such an image shift (misalignment) is used in the multi-shot compositing. This configuration is based on the concept that the amount of drive in the image blur correction drive using the vibration-proof unit 80 is significantly larger than the positional shift amount (pixel shift amount) of each image used in the multi-shot compositing.

In the third embodiment, a plurality of images is obtained by, for example, continuous shooting after setting the multi-shot composite mode (the multi-shot composite mode using camera shake, with image blur correction drive using the image stabilizing unit 80). Then, one composite image is obtained by image composite processing based on the plurality of images.

For example, as in the first embodiment, the configuration according to the third embodiment can detect the pixel shift amounts of a plurality of images, set any one of the plurality of images as a reference image, and set the remaining images as comparative images. Further, the configuration can select a composite target image from the comparative images based on the pixel shift amount between the reference image and each of the comparative images, and move the composite target image relative to the reference image based on the positional shift amount (pixel shift amount) to obtain a composite image.

Alternatively, as in the second embodiment, the configuration according to the third embodiment can divide a plurality of images into a predetermined number of image areas, and detect positional shift amount of each of the predetermined number of image areas in the plurality of images. Further, the configuration according to the third embodiment can select a composite target image area from the plurality of images based on the positional shift amounts.

The configuration of the vibration-proof unit 80 is described in detail with reference to FIGS. 12A, 12B, 13, 14, and 15. In each figure, a first direction (Z direction and Z-axis direction) is parallel to the optical axis O of the imaging optical system and a second direction (X direction and X-axis direction) is orthogonal to the first direction. Further, a third direction (Y direction and Y-axis direction) is orthogonal to both the first direction and the second direction. For example, assuming that the X axis, the Y axis, and the Z axis are coordinate axes in a three-dimensional orthogonal coordinate system, when the optical axis O is designated as the Z axis, the X axis and the Y axis are orthogonal to each other and both are orthogonal to the X-axis. When the digital camera is disposed in the normal position (horizontal position), the first direction (the Z direction, the Z axis, the optical axis O) and the second direction (the X direction and the X axis) are along the horizontal direction of the digital camera, and the third direction (the Y direction and the Y-axis) are along the vertical distance of the digital camera The digital camera includes, as a unit for detecting vibration (fluctuation) of a camera body CB, a roll (tilt (rotation) around the Z-axis) detecting unit, a pitch (tilt (rotation) around the X-axis) detecting unit, a yaw (tilt (rotation) around the Y-axis) detecting unit, an X-direction acceleration detecting unit, a Y-direction acceleration detecting unit, and a Z-direction acceleration detecting unit. Each detection unit includes a 6-axis sensor or a set consisting of a 3-axis gyro sensor and a 3-axis acceleration sensor. In some embodiments, each detecting unit may constitute the sensor 70 in FIG. 1.

An imaging block (for example, the camera unit 10 in FIG. 1) includes an image sensor 110 and a stage device 120 that supports the image sensor 110. The stage device 120 includes a movable stage 121 on which the image sensor 110 is mounted, a front stationary yoke 122 on the front of the movable stage 121, and a rear stationary yoke 123 on the back of the movable stage 121. The stage device 120 is capable of moving up the movable stage 121 (moved up against gravity and kept at rest) relative to the front and rear stationary yokes 122 and 123 at least when made conductive. The stage device 120 is capable of moving the movable stage 121 in a floating state (moved up) along the Z direction (first direction) (parallel movement in the Z direction), along the X direction (second direction) (parallel movement in the X direction) orthogonal to the Z direction, and along the Y direction (third direction) (parallel movement in the Y direction) orthogonal to both the Z direction and the X direction. Further, the stage device 120 is capable of causing the movable stage 121 in a floating state (moved up) to tilt (rotate) around the X-axis (second direction), around the Y-axis (third direction), and around the Z-axis (first direction). That is, the movable stage 121 is movable with six degrees of freedom, along 6 axes.

The body CPU (for example, the CPU 90 in FIG. 1) calculates the direction of blur and the blur speed of the digital camera based on pitch (tilting (rotation) in the X direction), yaw (tilting (rotation) in the Y direction), roll (tilting (rotation) in the Z direction), the X-direction acceleration, the Y-direction acceleration, and the Z-direction acceleration. The body CPU calculates, for example, the drive direction, the drive speed, the drive amount of drive of the image sensor 110 to prevent an image projected onto the image sensor 110 from moving relative to the image sensor 110. Based the calculation results, the CPU causes the stage device 120 to travel in parallel, tilt, travel in parallel while tilting, travel in parallel after tilting, and tilt after traveling in parallel.

The stage device 120 holds the movable stage 121, to which the image sensor 110 is fixed, such that the movable stage 121 freely travels in parallel, tilts, travels in parallel while tilting, and travels in parallel after tilting relative to the front stationary yoke 122 and the rear stationary yoke 123. The movable stage 121 is a rectangular plate member larger than the image sensor 110 when viewed from the front. The front stationary yoke 122 and the rear stationary yoke 123 are rectangular frame members each having the same shape and an outer shape larger than the movable stage 121 in plan view. Each of the front stationary yoke 122 and the rear stationary yoke 123 has a rectangular opening (122a/123a) larger than the outer shape of the image sensor 110 at the central portion of each of the front stationary yoke 122 and the rear stationary yoke 123, when viewed from the front (the Z direction).

Figure 12A:
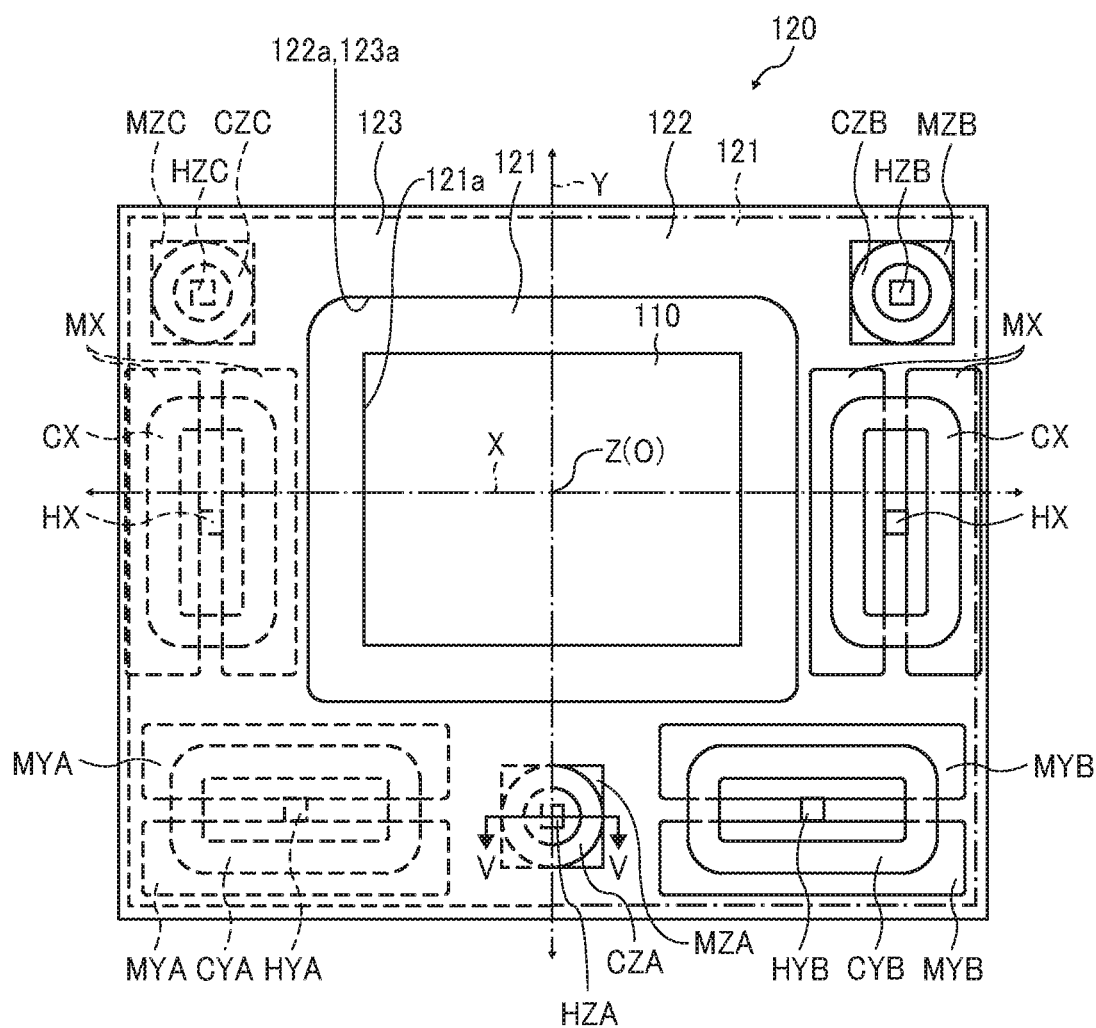
Figure 13:
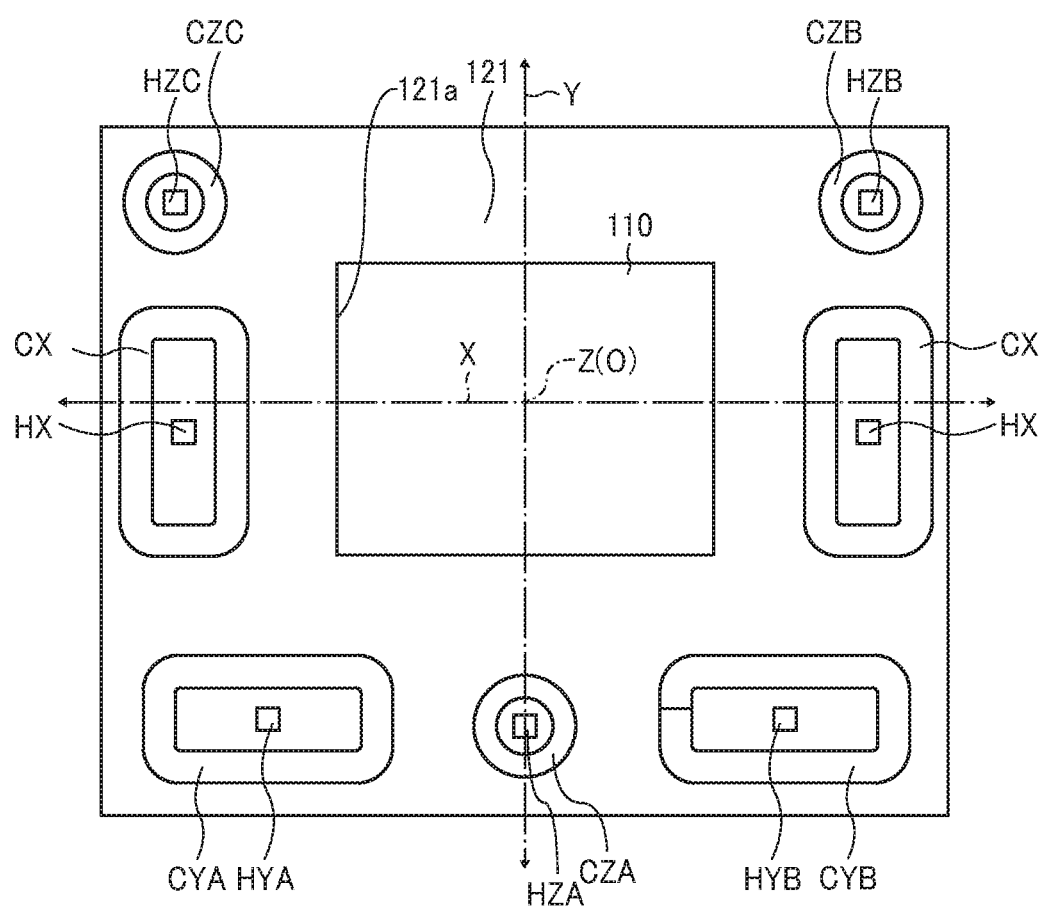
FIG. 13 is a rear view of a movable stage of the vibration-proof unit.
Figure 14:
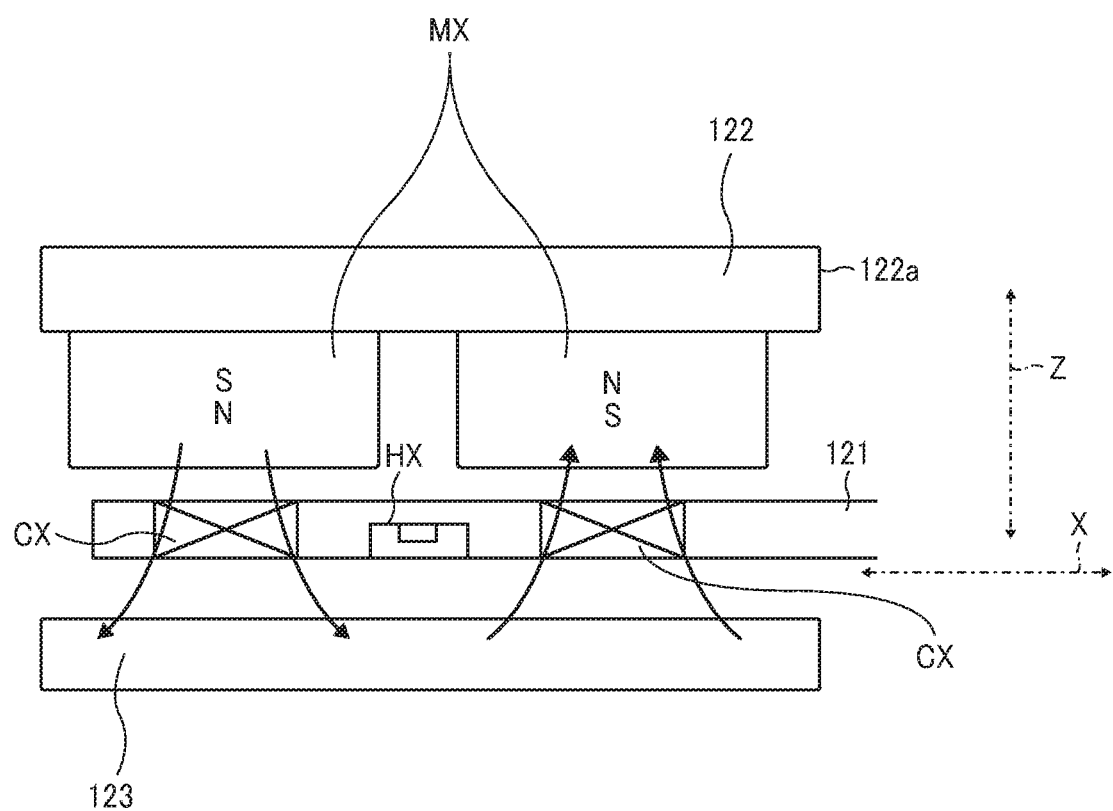
FIG. 14 is an enlarged cross-sectional view of an X drive unit including an X-direction magnet and an X-drive coil.
Figure 15:
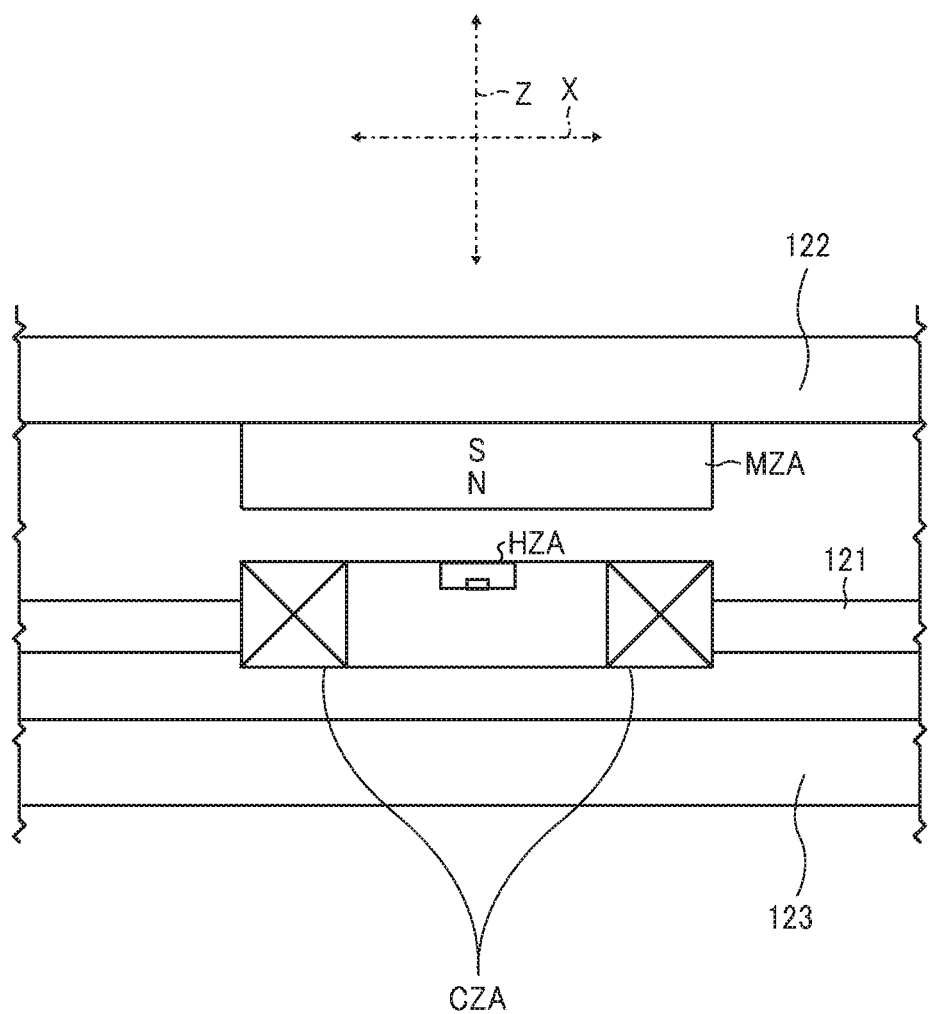
FIG. 15 is an enlarged cross-sectional view of a Z drive unit including a Z-direction magnet, a Z-drive coil, and a Z-direction Hall element.

The front stationary yoke 122 has an X-direction magnet MX on at least one side of the right and left (X direction) of the opening 122a with respect to the Z-axis with the Y-axis as the center line on the back (the surface opposite to the object side). However, in the embodiment as illustrated in FIGS. 12A and 12B, an X-direction magnet MX is disposed on each side of the right and left of the opening 122a. That is, a pair of X-direction magnets MX, each made of a permanent magnet having the same specification, is fixed to the back surface of the front stationary yoke 122. By passing the magnetic flux of the X-direction magnets MX through the front stationary yoke 122 and the rear stationary yoke 123, a magnet circuits that generates thrust in the X direction (the second direction) is formed between the X-direction magnets MX on the right and left sides and the opposed portion of the rear stationary yoke 123.

The front stationary yoke 122 has a pair of a Y-direction magnet MYA and a Y-direction magnet MYB at the lower side relative to the opening 122a on the back of the front stationary yoke 122. The magnet MYA and the magnet MYB are opposed to each other across the Y-axis as the center line and away from the Z-axis. Each of the magnet MYA and the magnet MYB is permanent magnet having the same specification. By passing the magnetic flux of the magnet MYA and the magnet MYB through the front stationary yoke 122 and the rear stationary yoke 123, a magnet circuit that generates thrust in the Y direction (the third direction) is formed between the magnet yoke 122 and the magnet yoke 123.

The front stationary yoke 122 also has Z-direction magnets MZA, MZB and MZC fixed onto three positions away from the Y-direction magnets MYA and MYB on the back surface. The magnets MZA, MZB and MZC are permanent magnets of the same specification. The three Z-direction magnets MZA, MZB, and MZC are disposed at substantially equal intervals in a plane orthogonal to the Z-axis with the Z axis as the center of the plane. By passing through the Z-direction magnets MZA, MZB and MZC through the front stationary yoke 122 and the rear stationary yoke 123, a plurality of magnet circuits that generates thrust in the Z direction (the first direction) is formed between the Z-direction magnets MZA, MZB and MZC and the rear stationary yoke 123.

The movable stage 121 has a hole 121a for the image sensor 110 at the center portion of the movable stage 121. The hole 121a is rectangular when viewed from the front. The image sensor 110 is fit in the hole 121a. The image sensor 110 projects forward beyond the hole 121a in the direction of the optical axis O of the movable stage 121.

The movable stage 121 further has a pair of X-drive coils CX and a pair of a Y-drive coil CYA and a Y-drive coil CYB. The X-drive coils CX are fixed onto the outer portions of the right and left sides (short sides) of the image sensor 110, respectively. The Y-drive coil CYA and the Y-drive coil CYB are fixed onto the lower portion of image sensor 110 (in the vicinity of the lower side (long side) of the image sensor 110), apart from each other along the right-to-left direction of the image sensor 110. The movable stage 121 further has a circular Z-drive coil CZA and a pair of circular Z-drive coils CZB and CZC. The Z-drive coil CZA is stationary (in the intermediate position) between the Y-drive coils CYA and CYB. The Z-drive coils CZB and CZC are stationary at the upper position relative to the pair of the X-drive coils CX.

The above-described X-drive coil CX, the Y-drive coil CYA, the Y-drive coil CYB, the Z-drive coil CZA, the Z-drive coil CZB, and the Z-drive coil CZC are connected to an actuator drive circuit that controls power distribution.

In the movable stage 121, X-direction Hall elements HX are fixed in the air core areas of the X-drive coils CX, and a Y-direction Hall element HYA and a Y-direction Hall element HYB are fixed in the air core areas of the Y-drive coils CYA and CYB, respectively. Further, Z-direction Hall elements HZA, HZB, and HZC are fixed in the air core areas of Z-drive coils CZA, CZB, and CZC, respectively.

A position detection circuit detects the position of the movable stage 121 in the X direction, the position in the Y direction, the position in the Z direction, the position of tilt rotation around the X-axis (tilt rotation angle around the X-axis and pitch angle), the position of tilt rotation around the Y-axis (tilt rotation angle around the Y-axis and Yaw angle), and the position of tilt rotation around the Z-axis (tilt rotation angle around the Z-axis and roll angle), based on detection signals output from X-direction Hall elements HX, the Y-direction Hall elements HYA and HYB, and Z-direction Hall elements HZA, HZB, and HZC.

Based on the detection result of the position detection circuit, the actuator drive circuit drives the image sensor 110 (the movable stage 121) by controlling power distribution to the X-drive coils CX, the Y-drive coils CYA, CYB, CZA and the Z-drive drive coils CZA, CZB, and CZC. For example, the vibration-proof unit 80 serves as a camera shake correction device (drive device) that corrects image blur (vibration) by driving (moving) the image sensor 110, which is a part of the image-capturing device, as a drive member in a direction different from the direction of the optical axis O (Z-axis) of the image-capturing device. Note that the drive member to be driven is not limited to the image sensor 110, and may be, for example, an image-blur correction lens as a part of the photographing lens.

The present inventor has conceived of the following concept through intensive studies of a technique of executing multi-shot composite while executing image-blur correction drive using the above-described hexaxial drive unit (however, the mode of image-blur correction is not limited) as one example. Even if a parallel-direction shift of the drive member (image sensor) remains within a plane (XY plane) orthogonal to the optical axis O (Z axis), the image quality of the multi-shot composite is not adversely affected. However, it is found that if a rotational-direction shift of the drive member (image sensor) remains within the plane (XY plane) orthogonal to the optical axis O (Z axis), the image quality of the multi-shot composite is adversely affected.

As described above, in the embodiments of the present disclosure, the image calculation such as detection of the positional shift amount (pixel shift amount) of a plurality of images or image areas is performed based on the XY coordinate axes in the XY plane. Accordingly, when a rotational shift within the XY plane is large, correlation between a plurality of images or between a plurality of image areas cannot be obtained, and appropriate image calculation may be difficult.

Figure 16A:
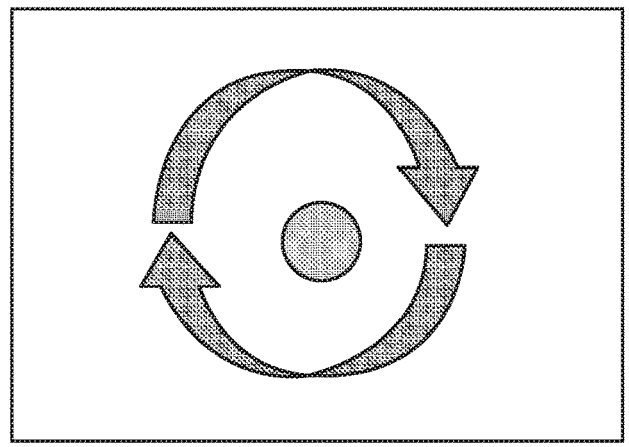
FIGS. 16A and 16B are illustrations for explaining adverse effects of image blur in the rotational direction within an XY plane.
Figure 16B:
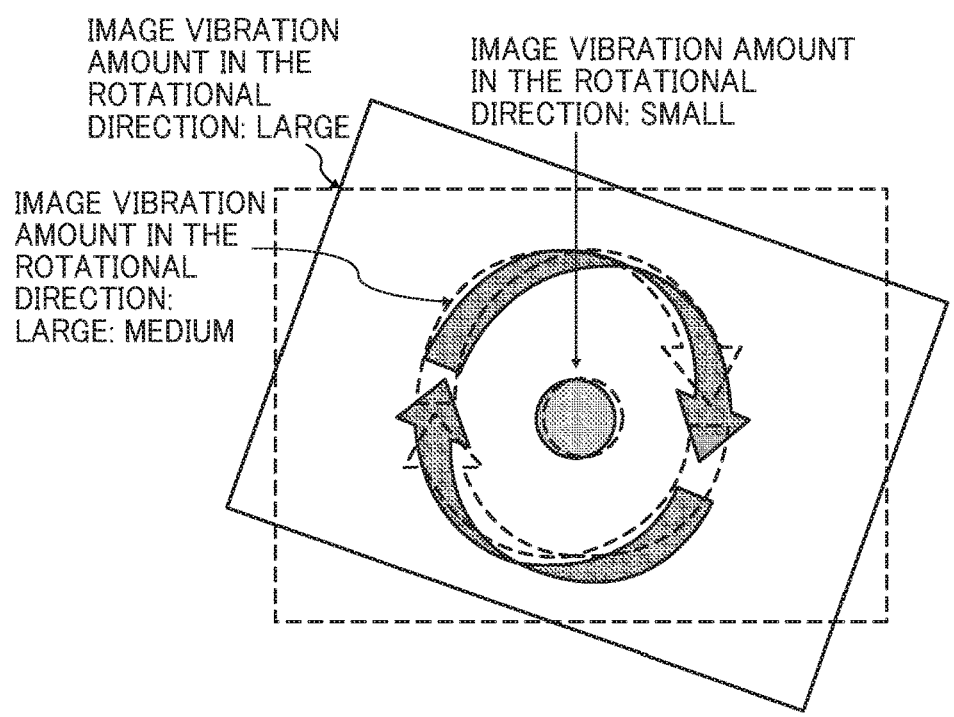

FIGS. 16A and 16B are illustrations of adverse effects of image blur (shift, vibration) in the rotational direction within the XY plane. As illustrated in FIGS. 16A and 16B, the image blur amount in the rotational direction within the XY plane decreases with a reduction in distance to the optical axis O (Z-axis) (closer to the center of the image), and increases with an increase in distance to the optical axis O (Z-axis) (closer to the periphery of the image).

In the embodiments of the present disclosure, not only the shift amount in the parallel direction within a plane (the XY plane) orthogonal to the optical axis O (Z axis) but also the shift amount in the rotational direction within the plane orthogonal to the optical axis O (Z axis) (the XY plane) is corrected using the vibration-proof unit 80. With such a configuration, the accuracy of the image calculation can be increased and the image quality of the multi-shot composite can be improved as well. Further, the processing load and the processing time of the image calculation can be reduce.

In some embodiments, the vibration-proof unit (drive device) 80 may relatively reduce the drive component (drive amount) of the drive member (image sensor) the parallel direction within a plane (XY plane) orthogonal to the optical axis O (Z axis), and relatively increase the drive component (drive amount) of the drive member (image sensor) in the rotational direction within the plane (XY plane) orthogonal to the optical axis O (Z axis). This configuration permits a certain amount of parallel-direction shift components (shift amount) of the driving member (image sensor) to remain in the XY image, which has a small adverse effect on the image quality of the multi-shot composite. Further, such a configuration positively eliminates the rotational-direction shift components (shift amount) of the driving member (image sensor) to prevent a significant adverse effect on the image quality to increase the image quality of the multi-shot composite.

Further, as in the second embodiment, by dividing a plurality of images into a predetermined number of image areas by the dividing unit 25 and calculating a positional shift amount (pixel shift amount) for each image area, the shift amount of drive member (image sensor) in the rotational direction can be reduced.

In this case, the image areas divided by the dividing unit 25 preferably have different sizes. More specifically, among the image areas divided by the dividing unit 25, the center portion of each of the plurality of images preferably has a relatively large size, and each image area of the peripheral portion of each of the plurality of images preferably has a relatively small size.

FIG. 17 is an illustration of an example in which a plurality of images is divided into image areas having different sizes. In FIG. 17, the image area is constituted by a total of 80 blocks in the minimum block unit, that is, eight blocks in the vertical direction×ten blocks in the horizontal direction. The image area in FIG. 17 is divided into a maximum image area block in the center portion of the image area, two intermediate image area blocks on each side of the maximum image area, and minimum image area blocks on the periphery of the image area, surrounding the maximum image area block and the intermediate image area blocks. The maximum image area block has a size of 16 (four-by-four pixels) minimum image area blocks (minimum block unit). The intermediate image area block has a size of 4 (two-by-two pixels) minimum image area blocks (minimum block unit).

For example, when there is a shift in the rotation direction among a plurality of images, the shift amount decreases toward the center portion of the image, and increases toward the periphery of the image (see FIGS. 16A and 16B). In view of this, the image area corresponding to the center portion of the image in which the shift amount in the rotational direction is small is divided into large (coarse) blocks, while the image area in the periphery of the image in which the shift amount in the rotational direction is large is divided into small (fine) blocks. Accordingly, the accuracy of image calculation in each image area block (particularly in the image area blocks in the periphery of the image) can be increased, and image quality of the multi-shot composite can be improved. Further, the processing load and the processing time of the image calculation can be reduced. In FIG. 17, if all the image area blocks are divided into the minimum image area blocks (minimum block units), the processing load of the image calculation and the processing time increase. Further, in FIG. 17, if all the image area blocks are divided into the maximum image area blocks, correlation between the image area blocks might not be obtained (the pixel shift amount might not be calculated) in the image peripheral portion in which the shift amount in the rotation direction is large. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the present disclosure have been described above, the present disclosure is not limited to the embodiments described above, but a variety of modifications can naturally be made within the scope of the present disclosure. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An apparatus, comprising:
a camera including an image sensor;
a sensor; and
processing circuitry configured to
detect a positional shift of each of a plurality of images continuously captured by the camera, based on a calculated amount of fluctuation of the image sensor due to shake of the image sensor detected by the sensor;
obtain a composite image based on the calculated amount of fluctuation of the image sensor and each set of image data of multiple continuously captured images;
set one of the plurality of images as a reference image and set remaining images of the plurality of images as comparative images;
compare the reference image and each of the comparative images;
detect a pixel shift amount between the reference image and each of the comparative images based on results of the comparing;
select a composite target image from the plurality of images based on the detected positional shift and a composite target image from the comparative images based on the detected pixel shift amount;
move the composite target image relative to the reference image based on the positional shift to obtain the composite image; and
move the composite target image relative to the reference image to have the composite target image overlay the reference image.

2. The apparatus according to claim 1, wherein the processing circuitry is further configured to detect the pixel shift amount of each of the plurality of images on one of a pixel-to-pixel basis and a subpixel-to-subpixel basis, based on a pixel output of the image sensor.

3. The apparatus according to claim 2, wherein the processing circuitry is further configured to exclude a pixel output to be used in an operation other than an image-capturing operation, from the pixel output of the image sensor.

4. The apparatus according to claim 1, wherein the processing circuitry is further configured to detect the pixel shift amount of each of the plurality of images for each RGB plane, based on a pixel output of the image sensor.

5. The apparatus according to claim 4, wherein the processing circuitry is further configured to detect the pixel shift amount of each of the plurality of images with a change in RGB plane to be used.

6. The apparatus according to claim 1, wherein the processing circuitry is further configured to move the composite target image relative to the reference image in units of movement different from units of detection at which the pixel shift amount is detected.

7. The apparatus according to claim 1, wherein the processing circuitry is further configured to:
   divide the plurality of images into a predetermined number of image areas;
   detect a positional shift for each of the predetermined number of image areas;
   select a composite target image area from the plurality of images, based on the detected positional shift for each of the predetermined number of image areas; and
   obtain the composite image based on the positional shift and the selected composite target image area.

8. The apparatus according to claim 7, wherein the processing circuitry is further configured to divide the plurality of images into an image area having a largest size at a central portion of each of the plurality of images and peripheral image areas each having a smallest size at a peripheral portion of each of the plurality of images.

9. The apparatus according to claim 1, wherein the plurality of images includes continuously captured images, and the obtained composite image includes two color-information components of G (Gr, Gb) or RGB color-information components for each pixel.

10. The apparatus according to claim 1, wherein the apparatus is a digital camera.

11. The apparatus according to claim 1, wherein the apparatus is a mobile phone.

12. The apparatus of claim 1, further comprising a memory that stores a program for causing the processing circuitry to detect the positional shift and to obtain the composite image.

13. A method of processing an image, the method comprising:
   detecting a positional shift of each of a plurality of images continuously captured by a camera including an image sensor, based on a calculated amount of fluctuation of the image sensor due to shake of the image sensor detected by a sensor;
   obtaining a composite image based on the calculated amount of fluctuation of the image sensor and each set of image data of multiple continuously captured images;
   setting one of the plurality of images as a reference image and set remaining images of the plurality of images as comparative images;
   comparing the reference image and each of the comparative images;
   detecting a pixel shift amount between the reference image and each of the comparative images based on results of the comparing;
   selecting a composite target image from the plurality of images based on the detected positional shift and a composite target image from the comparative images based on the detected pixel shift amount;
   moving the composite target image relative to the reference image based on the positional shift to obtain the composite image; and
   moving the composite target image relative to the reference image to have the composite target image overlay the reference image.

14. The method according to claim 13, wherein the plurality of images obtained in the obtaining step includes continuously captured images, and the obtained composite image includes two color-information components of G (Gr, Gb) or RGB color-information components for each pixel.

15. A non-transitory recording medium storing a program for causing a computer to execute a method of processing an image, the method comprising:
   detecting a positional shift of each of a plurality of images continuously captured by a camera including an image sensor, based on a calculated amount of fluctuation of the image sensor due to shake of the image sensor detected by a sensor;
   obtaining a composite image based on the calculated amount of fluctuation of the image sensor and each set of image data of multiple continuously captured images;
   setting one of the plurality of images as a reference image and set remaining images of the plurality of images as comparative images;
   comparing the reference image and each of the comparative images;
   detecting a pixel shift amount between the reference image and each of the comparative images based on results of the comparing;
   selecting a composite target image from the plurality of images based on the detected positional shift and a composite target image from the comparative images based on the detected pixel shift amount;
   moving the composite target image relative to the reference image based on the positional shift to obtain the composite image; and
   moving the composite target image relative to the reference image to have the composite target image overlay the reference image.

16. The non-transitory recording medium according to claim 15, wherein the plurality of images includes continuously captured images, and the obtained composite image includes two color-information components of G (Gr, Gb) or RGB color-information components for each pixel.

* * * * *